(12) United States Patent
Cheded et al.

(10) Patent No.: US 9,002,678 B1
(45) Date of Patent: Apr. 7, 2015

(54) UNIFIED APPROACH TO DETECTION AND ISOLATION OF PARAMETRIC FAULTS USING A KALMAN FILTER RESIDUAL-BASED APPROACH

(71) Applicant: King Fahd University of Petroleum and Minerals, Dhahran (SA)

(72) Inventors: Lahouari Cheded, Dhahran (SA); Rajamani Doraiswami, Ottawa (CA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/152,064

(22) Filed: Jan. 10, 2014

(51) Int. Cl.
*G06F 17/18* (2006.01)
*G05B 23/02* (2006.01)

(52) U.S. Cl.
CPC .............. *G06F 17/18* (2013.01); *G05B 23/0281* (2013.01)

(58) Field of Classification Search
CPC .................................................. G05B 23/0281
USPC ........................................................ 702/183
See application file for complete search history.

(56) References Cited

U.S. PATENT DOCUMENTS

| | | | |
|---|---|---|---|
| 7,260,501 B2 | 8/2007 | Pattipatti et al. | |
| 2006/0142976 A1* | 6/2006 | Bonanni et al. | 702/189 |
| 2006/0212281 A1 | 9/2006 | Mathews, Jr. et al. | |

FOREIGN PATENT DOCUMENTS

| | | |
|---|---|---|
| JP | 2013-21690 | 1/2013 |
| KR | 10-1189697 B1 | 10/2012 |
| KR | 10/1223898 B1 | 1/2013 |

OTHER PUBLICATIONS

Lefebvre et al., "The Linear Regression Kalman Filter", 2005, STAR 19, pp. 205-210.*
Soyoz et al., "Damage Detection and Structural Reliability Estimation based on Seismic Response Measurement", Proc. 8th Annual Intl. Conf. on Strl. Dynm., Jul. 4-6, 2011, pp. 2967-2971.*

* cited by examiner

*Primary Examiner* — Jonathan C Teixeira Moffat
*Assistant Examiner* — Regis Betsch
(74) *Attorney, Agent, or Firm* — Oblon, McClelland, Maier & Neustadt, L.L.P.

(57) ABSTRACT

A unified method to detection and isolation of parametric faults in a physical system resulting from variations in the parameters of its constituting subsystems, termed herein as diagnostic parameters, uses Kalman filter residuals. Rather than using the feature vector made of the coefficients of the numerator and denominator of the system transfer function, which is known to be a non-linear function of the diagnostic parameter variations, the method first shows and then exploits, for fault detection purposes, the fact that the Kalman filter residual is a multi-linear function of the deviations in the diagnostic parameters, i.e. the residual is separately linear in each parameter. A fault is then isolated using a Bayesian multiple composite hypotheses testing approach. A reliable map relating the diagnostic parameters to the residual is obtained off-line using fault emulators. The unified fault detection and isolation method is successfully evaluated on both simulated data as well as on real data obtained from a benchmarked laboratory-scale coupled-tank system used to exemplify an industrial two-tank process.

20 Claims, 12 Drawing Sheets

Two-tank fluid control system (left) and its block diagram representation (right).

The residuals and their auto-correlations for the fault-free (nominal) and faulty scenarios.

Plots of $\cos^2 \psi_i(k)$ when the diagnostic parameters $\gamma_i$ are varied to induce faults through emulators: high SNR (left 4 sub-figures) and $$Q = R = 0.5 \text{ (right 4 sub-figures)}$$

True and estimated fault sizes. The figures on the left and the right show respectively fault sizes for $Q = R = 0$ and $Q = R = 0.001$.

Two-tank fluid control system (left) and its block diagram representation (right).

Liquid level for normal and fault scenarios.

The residuals and their auto-correlations for the fault-free and faulty scenarios.

Plots of $\cos^2 \varphi_i(k)$ vs. $\gamma_i$ for leakage, actuator and sensor faults when $\gamma_i$; $i = 1,2,3$, are varied.

Physical closed-loop position control system.

Residuals and their correlations (left); fault sizes and fault isolation (right).

Mean-squared errors: the proposed (in green) and conventional (in maroon) schemes A computer system upon which an embodiment of the present invention may be implemented

UNIFIED APPROACH TO DETECTION AND ISOLATION OF PARAMETRIC FAULTS USING A KALMAN FILTER RESIDUAL-BASED APPROACH

BACKGROUND

1. Technical Field

The present disclosure relates to a method for detecting and isolating parametric faults in a physical system and a computer-implemented method therefore.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Whatever the application realm of interest may be, a fault remains an unwelcome event causing an undesirable perturbation in the normal operation of a system, with multifarious adverse effects such as loss in efficiency, productivity, reliability and profitability for several industries. Its detection and isolation therefore become imperative measures to be taken by any industry aspiring for economic survivability and ultimate success in today's highly competitive economic climate. For these, and possibly other reasons, fault detection and isolation has continued unabatedly to enjoy an increasing importance in many crucial areas such as mission critical systems, including aircraft and spacecraft, process control industries, power utilities, gas, oil and water distribution systems. The diagnosis of faults is vital from the points of view of asset management, shutdowns reduction, condition-based monitoring, product quality improvement, process reliability, economy, safety, pollution, and conservation of scarce resources that contributes to the protection of the environment.

Fault diagnosis of physical systems is still a challenging problem and continues to be a subject of intense research both in industry and in academia in view of the stringent and conflicting requirements in practice for a high probability of correct detection and isolation, a low false alarm probability, and a timely decision on the fault status (see for example: R. Doraiswami, L. Cheded, K. M. Haris, Sequential Integration Approach to Fault Diagnosis With Applications: Model-Free and Model-Based Approaches, VDM Verlag Dr. Muller Aktiengesselschaft and Co., 2010; S. Ding, Model-Based Fault Diagnosis Techniques: Design Schemes, Springer-Verlag, 2008; R. Doraiswami, C. P. Diduch, J. Tang, A new diagnostic model for identifying parameter faults, IEEE Transactions on Control Systems Technology 18 (3), (2010), pp. 533-544; M. Ferrente, B. Brunone, Pipe system diagnosis and leakage detection by unsteady-static tests, Chongking, China, in: Proceedings of the 7th International Conference on Intelligent Control and Automation, 2008; N. Orani, A. Pisano, E. Usai, Fault diagnosis for the vertical three-tank system via high-order sliding-mode observation, Journal of Franklin Institute 347 (2010), pp. 923-939; G. Heredia, A. Ollero, M. Bejar, R. Mahtani, Sensor and actuator fault detection in small autonomous helicopters, Mechatronics 18 (2) (2008)9, pp. 0-99; S. Silvio, C. Fantuzzi, R. J. Patton, Model-Based diagnosis using identification techniques, Advance sin Industrial Control, Springer-Varlag, 2003; R. Isermann, Fault diagnosis Systems from Fault Dection to Fault Tolerance, Springer-Verlag, 2006; R. J. Patton, P. M. Frank, R. N. Clark, Issues in Fault Diagnosis for Dynamic Systems, Springer-Varlag, 2000; A. Widodo, B. Yang, Support vector machine in machine condition monitoring and fault diagnosis, Mechanical Systems and Signal Processing 21 (2007) 2560-2574; R. Naresh, V. Sharma, M. Vashisth, An integrated neural fuzzy approach for fault diagnosis of transformers, IEEE Transactions on Power Delivery 23 (4) (2008) 2017-2024; M. Witczak, Advances in model-based fault diagnosis with evolutionary algorithms and neural networks, International Journal of Applied Mathematics and Computer Science 16 (1) (2006) 85-89; Bo, X. Quio, G. Zhang, Y. Bai, Zhang, An integrated independent component analysis and support vector machine for industry distillation monitoring, Journal of Process Control 20 (2010) 1133-1140; R. Doraiswami, Atwo-stage identification with application to control, feature extraction, and spectral estimation in: IEEE Proceedings: Control Theory and Applications, vol. 152 (4), 2005, pp. 379-386; J. F. Gertler, Fault Detection and Diagnosis in Engineering Systems, Marcel-Dekker Inc., 1998; M. Shahab, R. Doraiswami, An ovel two-stage identification of unstable systems, in: Proceedings of the Seventh International Conference on control and Automation (ICCA2010), Christ Church, New Zealand, 2009—each of which is incorporated herein by reference in its entirety).

In general, there are two broad classes to fault diagnosis: model-free and model-based ones.

Model-free approach: This approach includes tools based on limits checking, plausibility analysis, neural networks (ANN), fuzzy logic (FL), principal component analysis (PCA), Partial Least Squares (PLS) and more recently support vector machines (SVM). A model-free approach is capable of detecting a possible fault quickly, unraveling its root cause(s) and isolating it. Its independence from a model imparts to it an attractive freedom from the usual model-related difficulties such as identifying the required model, dealing with the presence of nonlinearities and structural complexities. However, these advantages are realized at a cost that could have various facets depending on the tool used. For neural networks, there is a lack of transparency, a need for a sufficient amount of training data covering most, if not all, operational scenarios, and a possibly lengthy training time. Fuzzy logic techniques, though less opaque than neural networks, suffer from the difficulty of deriving precise rules that distill an expert's knowledge of the application domain and which are necessary to drive the fuzzy inference engine.

Model-based approach: On the other hand, given the availability of an appropriate model, the model-based method is transparent and provides a complete and accurate diagnostic picture by exploiting a wealth of readily available and powerful analysis and design tools. Fortunately, the well-known difficulties in identifying a system model, due to its structural complexities and nonlinearities that may render its mathematical analysis intractable and its processing slow, may, for a vast number of practical systems, be mitigated by resorting to simple linearized models that are quite adequate in capturing most of the system dynamics of interest and whose predictive and inferential power can be enhanced by a rich repertoire of powerful linear analytical tools. The basic idea behind the model-based approach for fault diagnosis is to generate a signal termed the residual which, in the ideal case, is zero when there is no fault and non-zero otherwise. The ideal case refers to the situation where the model of the system is precisely known and there are no disturbances or measurement noise affecting the system. In practice however, the system is hardly free from such disturbances or measurement noise and these are either partially or totally unknown, thus making the derived model at best an approximation of the real system. There are various approaches to the generation of residuals including Kalman filter or observer-based approaches, parameter estimation methods, and parity vector methods (see for example: J. Chen, R. Patton, Robust Model-Based Fault Diagnosis for Dynamic Systems, Kluwer Academic Publishers, 1999; R. Doraiswami, L. Cheded, Kalman filter for fault detection: an internal model approach, IET Control Theory and Applications 6 (5) (2012), pp. 1-11-ech incorporated herein by reference in its entirety).

There are two types of fault models employed, namely additive and parametric (or multiplicative) types. In the additive type, a fault is modeled as an additive exogenous input to the system whereas in the parametric type, a fault is modeled as a change in the coefficients of the numerator and the denominator of the system transfer function or physical parameters which completely characterize the fault behavior of the subsystems. The Kalman filter is most widely and successfully used for additive fault detection while for parametric (multiplicative) faults, model identification-based schemes are employed.

The model-free approach is also capable of providing a quick visual detection of the onset of any fault from the changes in the fault signatures such as settling time, steady-state sensor output values, and the coherence spectrum of the residuals. The model-based approach has the ability for capturing any faults, especially incipient ones, which may escape capture by the model-free schemes such as neural network or fuzzy logic due to insufficient training data or incomplete fuzzy rules.

In the present disclosure, the Kalman filter residual is employed for both fault detection and isolation since (a) the Kalman filter residual is zero in the statistical sense if and only if there is no fault, and (b) its performance is robust to plant and measurement noise affecting the system output.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

The foregoing general description of the illustrative embodiments and the following detailed description thereof are merely exemplary aspects of the teachings of this disclosure, and are not restrictive.

In one embodiment the disclosure includes a unified method to detection and isolation of parametric faults in a physical system resulting from variations in the parameters of its constituting subsystems using Kalman filter residuals.

In another embodiment rather than using the feature vector made of the coefficients of the numerator and denominator of the system transfer function, which is known to be a non-linear function of the diagnostic parameter variations, the method first shows and then exploits, for fault detection purposes, the fact that the Kalman filter residual is a multi-linear function of the deviations in the diagnostic parameters, i.e. the residual is separately linear in each parameter.

In another embodiment the method includes isolating a fault using a Bayes in a multiple composite hypotheses testing approach.

In another embodiment are liable map relating the diagnostic parameters to the residual is obtained off-line using fault emulators.

In another embodiment a unified fault detection and isolation method is evaluated on both simulated data as well as on real data obtained from a benchmarked laboratory-scale coupled-tank system used to exemplify an industrial two-tank process.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
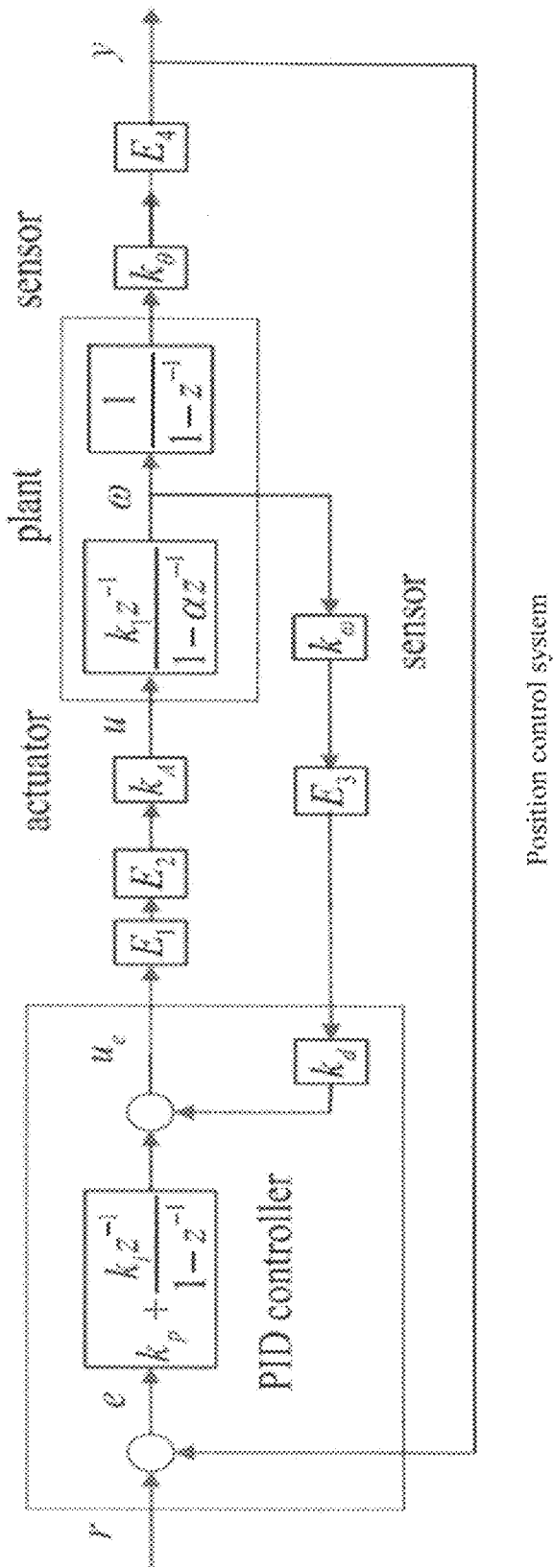
FIG. 1 illustrates a non-limiting example of a block diagram of a position control system, according to certain embodiments.

In general, a physical system consists of an interconnection of subsystems or components that may represent a physical entity of the system such as a sensor, actuator, controller or any other system component that may be subject to faults. Each of these parts is affected by the so-called unknown inputs that can be perceived as process and measurement noise as well as external disturbances acting on the system. Parameters, termed herein as diagnostic parameters, are selected so that they are capable of monitoring the health of the subsystems, and maybe varied either directly or indirectly (using a fault emulator) during the off-line identification phase. An emulator is a transfer function block which is connected to the input of a subsystem with a view to inducing into it faults which may arise as a result of variations in the phase and the magnitude of the transfer function of that subsystem. An emulator takes the form of a gain or an all-pass filter to induce gain or phase variations. A fault occurs within a subsystem when one or more of its diagnostic parameters vary. A variation in the diagnostic parameter does not necessarily imply that the subsystem has failed, but it may lead to a potential failure resulting in poor product quality, shutdown or damage to subsystem components. Hence a proactive action such as condition-based preventive maintenance must be taken prior to the occurrence of a fault.

The fault detection capability of the Kalman filter residual is extended to the task of fault isolation. It is shown that the residual is a linear function in each of the diagnostic parameters when other parameters are kept constant, that is it is a multi-linear function of the diagnostic parameters. A vector, termed influence vector, formed of the present and finite past residuals, and relating the residual vector to each diagnostic parameter variations plays a crucial role in the fault isolation process. The influence vector is thus made of elements that are partial derivatives of the residual with respect to each diagnostic parameter. The influence vectors are estimated off-line by performing a number of experiments. Each experiment consists of perturbing the diagnostic parameters one-at-a-time, and the influence vector is estimated from the best least-squares fit between the residual and the diagnostic parameter variations. When diagnostic parameters are not accessible, as in the case of plant model parameters, for example, the fault emulator parameters are perturbed instead. It is shown that the residual is a zero-mean white noise process if and only if there is no fault. If there is a fault, the residual is a non-zero-mean process, and is expressed as a sum of a deterministic component termed fault indicator, and a zero-mean stochastic component. The spectral content of a fault parameter is identical to that of the reference input and this property is used in the composite hypothesis testing strategy (see S. M. Kay, Fundamentals of Signal Processing: Estimation Theory, Prentice-Hall PTR, New Jersey, 1993—incorporated herein by reference).

The decision to select between the hypothesis that the system has a fault and the alternative hypothesis that it does not is extremely difficult in practice as the statistics of both the noise corrupting the data and the model that generated these data are not known precisely. Increasing the probability of correctly detecting a fault has a tendency to lead to increasing the probability of false alarm. On the other hand, reducing the probability of false alarm will also reduce the probability of correct detection. If the system is erroneously asserted to be faulty, it will then have dire consequences such as shutdowns resulting in loss of production, profits and hardships. On the other hand, if the system is asserted to be fault-free when it is actually not, it will then allow the existing fault to remain undetected, thus causing, with the passage of time, a serious damage to the system components which will, in turn, lead to unplanned plant shutdowns with all their concomitant costly and dangerous consequences. To effectively discriminate between these 2 important decisions (or hypotheses), the Bayes decision strategy is employed here as it allows for the inclusion of the information about the cost associated with the decision taken, and the a-priori probability of the occurrence of a fault. The fault detection and isolation problem is posed as a multiple hypothesis testing problem. The Bayes decision strategy is developed exploiting the fact that the residual is a zero-mean white noise process if and only if the system and the Kalman filter models are identical, that is if there is no model mismatch and therefore no fault (J. Mendel, Lessons in Estimation Theory in Signal Processing, Communications and Control, Prentice-Hall, 1995—incorporated herein by reference).

It is shown that a subsystem is faulty if the correlation between the measured residual and one of a number of hypothesized residual estimates is maximum. The proposed fault detection and isolation scheme is evaluated on (a) a simulated position control system to isolate the sensor, actuator and plant faults, and (b) a physical laboratory-scale two-tank process control system to isolate leakage, actuator and sensor faults. The main contributions of the scheme of the present disclosure are as follows.

The conventional approach models a fault as an additive exogenous input. Instead of an additive, a multiplicative (parametric) model is employed in the present disclosure. A fault is modeled as a parameter (diagnostic parameter), which completely captures the static and the dynamic behavior of the components. The key contribution of the present disclosure is that the residual is shown to be separately linear in the diagnosed parameters. Using the map relating the residual and the diagnostic parameters, a fault is isolated using a Bayesian multiple composite hypothesis testing approach taking into account the statistics of the noise and disturbances affecting the residual. The detection and isolation strategies are unified, and the incipient ('small') fault, if any, is then diagnosed as the Kalman filter residual has a minimum variance, implying that the measurement noises as well as the disturbance are both optimally filtered out.

The nominal model of the Kalman filter is obtained from a reliable and accurate identification, which is based on performing a number of diagnostic parameter-perturbed experiments (instead of the conventional scheme based on identifying the nominal mode from a single experiment). So much so that it can handle nonlinear physical systems (as verified by the evaluation on 3 physical systems). The analytical proof of this important point remains a challenging task and is currently receiving our attention. Instead of using an observer, a Kalman filter, which is optimally designed taking into account the statistics of the noise and disturbances affecting the system, is employed here. The scheme in the present disclosure has been successfully evaluated on simulated systems with low Signal to Noise Ratio (SNR) as well as physical systems and has shown itself to have a significantly superior performance over the conventional techniques.

Mathematical models: The model of the system is expressed in (a) a state-space form so that a Kalman filter may be designed for it, (b) a transfer function form used to express the residual in terms of the variations in the diagnostic parameters for fault isolation purposes and (c) in a linear regression form to be used for the system identification and estimation of the influence vector State-space model: The state-space form, which is a vector-matrix description of the dynamical system, is convenient in that it handles multivariate and time-varying systems and lends itself well to a powerful analysis, design and realization (or implementation) of filters (e.g. Kalman filter) and controllers. The state of a system is defined as the minimal set of information required to completely characterize this system. The state-space model of a system takes the following form $$x(k+1)=Ax(k)+Br(k)+E_w w(k)$$

$$y(k)=Cx(k)+u(k) \quad (1)$$

where $x(k)$ is the $n \times 1$ state vector, $y(k)$ is the output, $r(k)$ is the scalar reference input to the system, $w(k)$ the disturbance or plant noise, $u(k)$ the measurement noise, $A$ an $n \times n$ matrix, and $B$ an $n \times 1$ vector, $C$ a $1 \times n$ vector and $E_w$ an $n \times 1$ vector. It is assumed that y(k), r(k), w(k) and u(k) are all scalars. The plant noise w(k) may represent any input that affects the system but cannot be manipulated (unlike the input r) including the gravity load, electrical power demand, fluctuations in the flow in a fluid system, wind gusts, bias, power frequency signal, dc offset, crew or passenger load in vehicles such as spacecraft, ships, helicopters and planes, faults or merely a mathematical artifice to serve a specific purpose as explained below. When either the measurement noise or the plant noise or both are small, the estimation error diverges due to numerical errors resulting from ill-conditioned matrices. To avoid this divergence, a fictitious white plant noise w(k), is added to the state space (or dynamical) equation. In many cases the disturbance term w(k) is conveniently included as a mathematical artifice to represent the present disclosure's measure of belief in the model and to provide an additional parameter which, through its variance helps in designing a filter. Further the variance provides a trade-off between a faster filter response and a better noise attenuation in the filter estimates. In fault diagnostic applications, the B and C matrices capture respectively the effects of actuator and sensor faults, respectively. In order to derive the structure of the Kalman filter, the present disclosure needs to assume that the system enjoys some necessary properties. One such property is the observability of a system. The present disclosure shall now assume that this property applies to the case of the present disclosure, namely that the system(A, C) is observable.

If the system is observable, then all the states may be estimated from the input-output data. The plant noise w(k), and the measurement noise u(k) are assumed to be zero-mean white noise processes however, if w(k) and u(k) are colored noise processes, then they must have rational spectra. As such w(k) and u(k) are modeled as outputs of a known linear system driven by a zero-mean white noise process. In this case, it is always possible to rewrite the given model with its colored noise inputs, as an augmented system containing the dynamics of the zero-mean white noise-driven schemes that generate these colored noise inputs with covariances given by $$E[w^T w] = Q \text{ and } E[v^T v] = R \qquad (2)$$

It is assumed that both matrices in (2) are symmetric, with the covariance of the measurement noise (R) being positive definite and that of the plant noise (Q) positive semi-definite.

Transfer Function Model

A frequency-domain model relating the reference input to the system output derived from the state-space model (1) is given by $$D(z)y(z) = N(z)r(z) + v(z) \text{ where} \qquad (3)$$

$$\frac{N(z)}{D(z)} := G(z) = C(zI - A)^{-1} B;$$

$$v(z) = D(z)(C(zI - A)^{-1} E_w w(z) + v(z));$$

$$D(z) = 1 + \sum_{i=1}^{n_a} a_i z^{-i};$$

$$N(z) = \sum_{i=0}^{n_b} b_i z^{-i}; \{a_i\} \text{ and } \{b_i\}$$

are coefficients of D(z) and N(z), respectively with $n_a$ and $n_b$ their respective orders; G(z) is the plant transfer function and v(z) is the plant noise.

Linear Regression Model

A linear regression model derived from the model in (3) is given by $$y(k) = \psi^T(k)\theta + v(k) \qquad (4)$$

where $$\psi^T(k) = [-y(k-1) - y(k-2), \ldots, -y(k-n_a) r(k-1) \\ r(k-2), \ldots, r(k-n_b))] \qquad (5)$$

$$\theta = [a_1 a_2, \ldots, a_{n_a} b_1 b_2, \ldots, b_{n_b}]^T \qquad (6)$$

Kalman Filter Model

The state-space model of the Kalman filter is configured as a closed-loop system which is (a) an exact copy of the nominal (fault-free) model of system (1), denoted by $(A_0, B_0, C_0)$, (b) is driven by the output estimation error e(k), and (c) is stabilized by the Kalman gain $K_0$:

$$\hat{x}(k+1) = A_0 \hat{x}(k) + B_0 r(k) + K_0(y - C_0 \hat{x}(k))$$

$$\hat{y}(k) = C_0 \hat{x}(k)$$

$$e(k) = y(k) - \hat{y}(k) \qquad (7)$$

where $\hat{x}(k)$ is the estimate of the state x(k), $\hat{x}(k)$ the estimate of the output y(k) and e(k) the residual (or an innovation) process.

Linear Regression Model of the Residual

A fault diagnosis scheme is developed here for the case where a fault is modeled as the result of variations in the diagnostic parameters characterizing a subsystem. First it is shown that the residual is a function of the model mismatch expressed in terms of (a) the deviation between the nominal and the actual system transfer function and then (b) in terms of the deviation between the nominal and the actual feature vectors.

Parametric Fault and Kalman Filter Residual

A fault isolation scheme is developed by deriving an expression relating the feature vector deviations to the diagnostic parameter variations. The following Lemma 1 relates the Kalman filter residual e(k) to the plant output y(k) and reference input r(k).

Lemma 1.

If the system and the Kalman filter models are given by (1) and (7), then the frequency-domain expression of the residual, i.e. e(z), is given, in terms of the plant output y(z) and reference input r(z), by $$e(z) = (D_0(z)/F_0(z))y(z) - (N_0(z)/F_0(z))r(z) \qquad (8)$$

where $(D_0(z)/F_0(z)) = I - C_0(zI - A_0 + K_0 C_0)^{-1} K_0$; $(N_0(z)/F_0(z)) = C_0(zI - A_0 + K_0 C_0)^{-1} B_0$ and $F_0(z) = |zI - A_0 + K_0 C_0|$ The following Lemma 2 relates, in the frequency-domain, the residual e(z) to the deviation in the actual feature vector $\theta$ from the nominal one denoted by $\theta^0$.

Lemma 2.

$$e(z) = (1/F_0(z))(\psi^T(z)\Delta\theta + v(z)) \text{ where} \qquad (9)$$
$\psi(z)$ is the z-transform of $\psi(k)$, given by $$\psi^T(z) = [-z^{-1} y(z) - z^{-2} y(z) \ldots - \\ z^{-n_a} y(z) z^{-1} r(z) z^{-2} r(z) \ldots z^{-n_b} r(z)] \text{ and} \qquad (10)$$

$\Delta\theta$ is given by
$\Delta\theta = \theta - \theta^0$

-continued with $\theta = [a_1\ a_2, \ldots, a_{n_a}\ b_1\ b_2, \ldots, b_{n_b}]$ and (11)
$\theta^0 = [a_{10}\ a_{20}, \ldots, a_{n_a 0}\ b_{10}\ b_{20} \ldots, b_{n_b 0}]^T$
are respectively the feature vectors of the system
$G(z) = \dfrac{N_0(z)}{D_0(z)}$ whosen nominal version is $G_0(z) = \dfrac{N_0(z)}{D_0(z)}$ with $D_0(z) = 1 + \sum_{i=1}^{n_a} a_{i0} z^{-i}$;

$N_0(z) = \sum_{i=1}^{n_b} b_{i0} z^{-i}$, By letting $\Delta a_i = a_i - a_{i0}$;

$\Delta b_i = b_i - b_{i0}$, we can then write $$\Delta\theta = \theta - \theta^0 = [\Delta a_1 \Delta a_2 \cdot \Delta a_{n_d} \Delta b_1 \Delta b_2 \cdot \Delta n_{b_n}]T \quad (12)$$

It is interesting to note that (9) reveals an interesting fact, namely that the residual of the Kalman filter e(k) can be expressed as a sum of a fault indicator component $e_f(k)$ and a zero-mean noise component $e_0(k)$.

$$e(z) = e_f(z) + e_0(z) \text{ where} \quad (11)$$

$$e_f(z) = \dfrac{\psi^T(z)\Delta\theta}{F_0(z)}; e_0(z) = \dfrac{v(z)}{F_0(z)}$$

The key results of this sub-section in the form of two theorems:

Theorem 1.

The Kalman Filter residual is a zero-mean random process if and only if there is no model mismatch.

$$\lim_{k\to\infty} E[e(k)] = 0 \text{ if and only if } \Delta\theta = 0 \quad (12)$$

Proof.

Note that the assumption that v(k) is a zero-mean random process leads to E[v(z)]=0 and, from (14), $E[e_o(k)]=0$. Taking the expectation of (14) leads directly to $$E[e(z)] = E[e_f(z)] = [E[\psi^T(z)]\Delta\theta/F_0(z)] \quad (13)$$

Since $F_0(z)$ is an asymptotically stable polynomial, we conclude that (12) holds.

The next theorem (Theorem 2) characterizes the Kalman filter's residual even further than Theorem 1 by bringing out the crucial importance of the optimality of the Kalman filter gain.

Theorem 2.

The Kalman filter residual is a zero-mean white noise process if and only if there is no model mismatch and the Kalman filter is optimal (i.e. time-varying).

In such a case, the auto-correlation of the residual is a Dirac delta function $$E[e(k)e(k-m)] = \sigma_e^2 \delta(m) \quad (14)$$

where $\sigma_e^2 = E[e^2(k)]$ if and only if $\Delta\theta = 0$ (i.e. no mismatch) and the Kalman gain K is optimal.

Proof.

It is shown that the residual is a zero-mean white noise process if and only if there is no model mismatch (see B. F. Francis, M. W. Wonham, The internal model principle of control theory, Automatica 12 (1976), pp. 457-465—incorporated herein by reference).

This shows that the choice of the Kalman gain $K_0$ which determines the filter $F_0(z)$ is crucial in its ability to both attenuate the effect of the noise and the disturbance and whiten the residual. In order to ensure an increased robustness to disturbance and an increased sensitivity to fault effect, recent studies on fault detection filter design have employed a two-degree-of-freedom structure. A constant observer gain and a post-filter are used to achieve the two stated objectives of fault indication and noise attenuation (see: A. Pertew, H. Marquez, Q. Zhao, H-infinity observer design with applications in fault diagnosis, Seville, Spain, 2006, pp. 3803-3809—incorporated herein by reference). In the present disclosure, although the Kalman filter structure provides only a single-degree of freedom structure characterized by the gain $K_0$, it nevertheless achieves the two stated objectives by judiciously fusing the information provided by the system model $(A_0, B_0, C_0)$, the disturbance variance Q, and the measurement variance R. Note here that one may perform the 2 stated objectives in 2 separate tasks: the first task of fault indication ($e_f$) which is taken care of by the observer and the second task of noise attenuation ($e_0$) which is taken care of by the post-filter. Thus, an intuitive explanation of the superiority of the KF in achieving these 2 tasks simultaneously with its single-degree-of-freedom structure is that it acts as an observer in a statistical sense by jointly detecting $e_f$, while at the same time attenuating the effect of $e_0$ through its function as a filter.

Conventional Approach to Parametric Fault Isolation

In previous parametric fault isolation schemes (see: R. Doraiswami, Modeling and identification for fault diagnosis: a new paradigm, in: Proceedings of the 10$^{th}$ International Conference on Control Applications, Mexico City, Mexico, 2001, pp. 236-241—incorporated herein by reference), the residual is generated by subtracting the fault-free output $y^0(k)$ of the model with nominal parameters $\theta^0$ from the actual output y(k) with the corresponding actual parameter $\theta$. The residual, denoted by $\Delta y(z) = y(z) - y^0(z)$ is simply the difference between the two outputs given by $$\Delta y(z) = \psi^T(z)\Delta\theta + u(z) \quad (15)$$

In the present disclosure the residual is generated by the Kalman filter given by (9) which enjoys desirable properties of whiteness and minimum variance of the noise and disturbance, thanks to the filtering action of $F_0(z)$ when the Kalman filter is optimal. Hence smaller deviations in the diagnostic parameters which are buried in the noise may be captured as long as the variance of the residual is minimum.

Diagnostic Model

The system is modeled as an interconnection of subsystems that are each subject to faults. A subsystem is characterized by parameters termed physical parameters. A subsystem is said to be faulty if a physical parameter deviates from its nominal fault-free value. A variation in the physical parameter does not necessarily imply that the subsystem has failed, but may provide an early warning that a potential failure may be in the offing which, upon occurrence, may cause adverse effects such as poor product quality, shutdown, and damage to subsystem components or possibly danger to the operating personnel. Hence a proactive action, based for example on condition-based preventive maintenance must be taken to avert the occurrence of potential faults. The physical parameters are selected so that they are capable of monitoring the health of the subsystem, and may be varied either directly or indirectly. A model, termed diagnostic model, is developed that governs the mapping between the system input, the system output and the physical parameters. The diagnostic model is completely defined by a matrix termed influence matrix which is formed of the partial derivatives of the feature vector with respect to the physical parameters, thus depicting the sensitivity of the feature vector to these parameters. The influence matrix characterizes the system under parametric variations in subsystems such as sensors, actuators, controllers and process dynamics. These variations may be caused by faults and/or, for example, the system's migration from one operating regime to another.

Mapping Between the Feature Vector and Physical Parameters

Consider a discrete-time system formed of a cascade, parallel and feedback interconnection of subsystems characterized by physical parameters $\{\gamma_i\}$. Let the physical parameter $\gamma_i$ be expressed as a sum of its nominal value $\gamma_i^0$ and its variation $\Delta\gamma_i$ as given below:

$$\gamma_i = \gamma_i^0 + \Delta\gamma_i, \quad i=1,2,3,\ldots,q \quad (16)$$

Let $\theta$ and $\theta^0$ be the actual and nominal feature vectors, respectively. Their deviation $\Delta\theta$ is given by $$\Delta\theta = \theta - \theta^0 \quad (17)$$

The feature vector $\theta$ will be some nonlinear function of the physical parameter $\gamma$. The nonlinear map relating the feature vector deviations to the physical parameters is given by $$\Delta\theta = \phi(\Delta\gamma) \quad (18)$$

Where $\phi(.)$ is some M×1 nonlinear function, and $\Delta\gamma = [\Delta\gamma_1 \, \Delta\gamma_2 . \, \Delta\gamma_q]^T$ It can be shown that the nonlinear function $\phi(\Delta\gamma)$ takes the form of a truncated power series in the deviation of the physical parameters. The functional relation between $\Delta\theta$ and $\Delta\gamma$ can be expressed as a power series in $\{\Delta\gamma_i\}$ with a finite number of terms as given below:

$$\phi(\Delta\gamma) = \sum_i \Omega_i \Delta\gamma_i + \sum_{i,j} \Omega_{ij} \Delta\gamma_i \Delta\gamma_j + \ldots + \sum_{1,2,3\ldots q} \Omega_{123\ldots q} \Delta\gamma_1 \Delta\gamma_2 \Delta\gamma_3, \ldots, \Delta\gamma_q \quad (19)$$

where $\Omega_i, \Omega_{ij}, \Omega_{ijk}, \ldots \Omega_{1,2,3,\ldots,q}$ denote the first, second, third and up to qth partial derivative of $\theta$ with respect to $\gamma$ as given by $$\Omega_i = \frac{\partial\theta}{\partial\gamma_i}, \, \Omega_{ij} = \frac{\partial^2\theta}{\partial\gamma_i\partial\gamma_j}, \, \Omega_{123,\ldots,q} = \frac{\partial^q\theta}{\partial\gamma_1\partial\gamma_2\partial\gamma_3,\ldots,\partial\gamma_q} \quad (20)$$

The partial derivative terms $\{\Omega_i, \Omega_{ij}, \Omega_{ijk}, \ldots\}$, which are the Jacobian of the feature vector with respect to the physical parameters, are termed influence vectors. Named as such, these vectors influence the direct effect of parameter variations on the feature vector. The influence vectors completely characterize the diagnostic model. The power series expansion terms include products of the deviations $\{\Delta\gamma_i\}$ taken one-at-a-time, two-at-a-time and so on up to q-at-a-time, and its number of terms is finite. A parametric fault, which is modeled as a change in a physical parameter $\gamma_i$, is isolated using the residual generated by the Kalman filter. First the Kalman filter residual is analyzed to detect the presence or absence of a fault. If there is a fault, the residual is then subjected to a detailed analysis to determine which of the physical parameters $\gamma_i$:i=1, 2, 3, . . . , q has varied.

Diagnostic Model

A diagnostic model is a multi-input, single-output system that relates the system inputs, the system output and the diagnostic parameter variations to the residual. Consider the expression of the fault effect component $e_f(z)$ expressed in terms of the deviations in the feature vector $\Delta\theta$ where $\Delta\theta$ is given by Eqs. (18) and (19):

$$e_f(z) = \psi_{filt}^T(z)\phi(\Delta\gamma) \quad (21)$$

A vector matrix equation relating the N×1 vector made of the present (k=0) and the past (N−1) residuals e(k), k=1, 2, . . . , N−1, to the fault effect component $e_f(k)$ and the noise term $e_0(k)$ is given by $$e(k) = e_f(k) + e_0(k) \quad (22)$$

$$e(k) = \begin{bmatrix} e(k) \\ e(k-1) \\ e(k-2) \\ e(k-3) \\ \vdots \\ e(k-N+1) \end{bmatrix}, e_f(k) = \begin{bmatrix} e_f(k) \\ e_f(k-1) \\ e_f(k-2) \\ e_f(k-3) \\ \vdots \\ e_f(k-N+1) \end{bmatrix}, \quad (23)$$

$$e_0(k) = \begin{bmatrix} e_0(k) \\ e_0(k-1) \\ e_0(k-2) \\ e_0(k-3) \\ \vdots \\ e_0(k-N+1) \end{bmatrix}$$

Bayes Decision Strategy

A unified approach that handles both detection and isolation of faults using a probabilistic approach based on Bayes decision strategy is used here. First the Kalman filter residual is analyzed to detect the presence or absence of a fault. If there is a fault, the residual is then subjected to a detailed analysis to determine which of the physical parameters $\gamma_i$:i=1, 2, 3, . . . , q has varied, thereby isolating a fault subsystem.

Fault Detection

The Bayesian method cannot be applied directly to the detection problem as the probability density function (PDF) of the residual is either unknown or, at best, partially known. The parameters of the PDF under the hypothesis that there is a fault are generally unknown and hence a simple hypothesis test cannot be employed. Instead a composite hypothesis testing scheme is employed here. There are two approaches to handling the unknown parameters in the PDF of the residual. One approach is to assume the unknown parameters as random variables and assign a PDF to them. The second approach is to estimate the unknown parameters a posteriori from the measurement data using the maximum likelihood method, and this approach is termed the Generalized Likelihood Ratio Test (GLRT). The GLRT is used herein as it is both computationally efficient and has been successfully used in practice (see: S. M. Kay, Fundamentals of Signal Processing: Detection Theory, Prentice-Hall Inc., New Jersey, USA, 1998—incorporated herein by reference).

The fault-indicating component $e_f(k)$ contains all the information on the fault status of the system; it will therefore be zero if and only if there is no fault. The detection problem may be posed as a binary hypothesis testing problem. A batch processing scheme is adopted here where residuals, taken in a sliding time window of length N, are processed at each time instant. At time instant k, the N residuals formed of the present and past (N−1) residuals e(k−i):=0, 1, 2, . . . , N−1, are collected. Let $H_0$ and $H_1$ be the two hypotheses indicating the absence and presence of a fault, respectively. The corresponding residual models under these hypotheses are derived from (22) and are given below:

$$H_0: e(k) = e_0(k) \quad (23)$$

$$H_1: e(k) = e_f(k) + e_0(k) \quad (24)$$

Since the fault-indicating component $e_f(k)$ is unknown, it is therefore replaced by its maximum likelihood estimate in the composite hypothesis testing scheme used. In deriving this estimate, we use the fact that its spectral content is identical to that of the reference input. For example if the reference input is a constant or a sinusoid, then $e_f(k)$ is also a constant or a sinusoid, respectively. The following assumption is employed here to simplify the derivation of the Bayes decision strategy for the detection and isolation of faults without adversely affecting the estimates.

Assumption

The noise component $e_0(k)$ is a zero-mean white noise process. It is to be noted that this assumption holds exactly only if there is no model mismatch and may hold approximately for small deviations in the diagnostic parameters. The decision strategy takes the general form $$t_s(e) \begin{cases} \leq \eta & \text{no fault} \\ > \eta & \text{fault} \end{cases} \quad (25)$$

where $t_s(e)$ is the test statistics of the residual e and $\eta$ is the threshold value computed by taking into account the variance of the noise term $e_0(k)$, prior probabilities of the two hypotheses, the cost associated with correct and wrong decisions, and the probability of false alarm.

Test statistics when the reference input r(k) is a constant, a sinusoid of frequency $f_0$ and an arbitrary signal are listed below:

$$t_s(e) = \begin{cases} \left| \frac{1}{N} \sum_{i=k-N+1}^{k} e(i) \right| & r(k) = \text{constant} \\ P_{ee}(f_0) & r(k) \text{ is a sinusoid} \\ \frac{1}{N} \sum_{i=k-N+1}^{k} e^2(i) & r(k) \text{ is an arbitary signal} \end{cases} \quad (26)$$

Fault Isolation

The residual contains the complete information on the model mismatch. Herein, we subject the residual to a detailed analysis to determine which of the physical parameters $\gamma_i, i=1, 2, 3, \ldots, q$ has varied by hypothesizing whether there is a variation in any single diagnostic parameter $\gamma_i$, or simultaneous variations in any pair $\gamma_i \gamma_j$, or simultaneous variations in any triplet $\gamma_i \gamma_j \gamma_k$, or finally simultaneous variations in the entire set of the $\gamma$ parameters. As the residual e(k) is a non-linear function of the variations $\{\Delta \gamma_j\}$, the fitting problem is solved sequentially as explained next. First, let us hypothesize that a single variation in $\{\gamma_i\}$ has occurred. If the estimates thus obtained do not fit the residual model, then we repeat the process by hypothesizing the occurrence of two simultaneous variations $\{\gamma_i \gamma_j\}$. If again the estimates do not cumulatively fit the residual model, then we hypothesize the occurrence of three simultaneous variations $\{\gamma_i \gamma_j \gamma_k\}$ and so on until we reach a stage where the estimates fit the residual model. Let $H_{ijk}$ denote the hypothesis based on the simultaneous variations in k diagnostic parameters $\gamma_i, \gamma_j$ and $\gamma_k$. Then the hypotheses based on q simultaneous variations are specified by:

$H_i$: The diagnostic parameter $\gamma_i$, has changed, $$e(k) = \psi^T(k) \Omega_i \Delta \gamma_i + e_0(k) \quad (27)$$

$H_{ij}$: The diagnostic parameters $\gamma_i$ and $\gamma_j$ have changed, $$e(k) = \psi^T(k) \left[ \sum_i \Omega_i \Delta \gamma_i + \Omega_{ij} \Delta \gamma_i \Delta \gamma_j \right] + e_0(k) \quad (28)$$

$H_{ijk}$: The diagnostic parameters $\gamma_i, \gamma_j$ and $\gamma_k$ have changed, $$e(k) = \psi^T(k) \Big[ \Omega_i \Delta \gamma_i + \quad (29)$$

$$\Omega_j \Delta \gamma_j + \Omega_k \Delta \gamma_k + \sum_{i,j} \Omega_{ij} \Delta \gamma_i \Delta \gamma_j + \Omega_{ijk} \Delta \gamma_i \Delta \gamma_j \Delta \gamma_k \Big] + e_0(k)$$

$H_{123 \ldots q}$: The diagnostic parameters $\gamma_1, \gamma_2, \gamma_3, \ldots, \gamma_q$ have changed:

$$e(k) = \psi^T(k) \Big[ \sum_i \Omega_i \Delta \gamma_i + \sum_{i,j} \Omega_{ij} \Delta \gamma_i \Delta \gamma_j +$$

$$\sum \Omega_{ijk} \Delta \gamma_i \Delta \gamma_j \Delta \gamma_k + \Omega_{123 \ldots q} \Delta \gamma_1 \Delta \gamma_2, \ldots, \Delta \gamma_q \Big] + e_0(k)$$

The Fault Detection and Isolation Scheme for Single Faults

Consider the single-fault case where only one of the q parameters in the set $\{\gamma_i, i=1, 2, \ldots, q\}$ changes at any one time, with its value remaining constant during the execution of the detection and isolation logic. The focus of the present disclosure is on the fault isolation scheme. Once a fault is detected, the residual is predicted under different hypotheses and then correlated with the measured residual to classify the fault. There are q hypotheses of the form given by (27). If $e_0(k)$ is a zero-mean Gaussian random variable, then the Bayes strategy suggests that the most likely hypothesis H, is the one that satisfies, $$\min_i \| e(k) - \psi^T(k) \Omega_j \Delta_{\gamma_j}(k) \|^2 \quad (31)$$

where $\|x\|^2 = x^T x$. The solution of the minimization problem (31) is given in Appendix C. The fault isolation scheme reduces to the optimal selection of the index l of the most likely hypotheses $H_i$:

$$l = \arg\left( \max_j \{\cos^2 \varphi_j(k)\} \right) \quad (32)$$

where $\cos 2\phi i(k)$ is the cosine of the angle between the residual e(k) and its estimate $\psi^T(k)\Omega_i$ given by $$\cos^2 \varphi_j(k) = \left[ \frac{\langle e(k), \psi^T(k)\Omega_j \rangle}{\|e(k)\| \|\psi^T(k)\Omega_j\|} \right]^2. \quad (33)$$

The interpretation of (32) is that if a fault has been detected, then it is the hypothesis $H_l$, which states that there is change in $\gamma_l$, that is asserted to be true if l is the value of j for which $\{\cos^2 \phi_j(k), j=1, 2, \ldots, q\}$ is maximum.

In other words, it states that the distance between the vector e(k) and the hyperplane generated by the columns of the residual influence matrix $\psi^T(k)\Omega_j \Delta\gamma_j(k)$ must be minimum.

Further the size of the fault $\Delta\gamma l(k)$ is $$\Delta\gamma_l(k) = (\psi^T(k)\Omega_l)^\dagger e(k) \quad (34)$$

In order to ensure that all types of faults are isolated, we assume that the influence vectors $\{\Omega_j\}$ are linearly independent. Note here that the condition for fault isolability is given previously.

Evaluation of the Unified Scheme on a Simulated Position Control System

A position control system shown in FIG. 1 consists of a plant, a PID controller, an actuator, a position sensor, and a velocity sensor, with respective transfer functions $G_p(z)=(k_1/1-\alpha z^{-1})(1/1-z^{-1})$; $G_c(z)=(k_p+(k_I-k_p)z^{-1}/1-z^{-1})$; $G_A(z)=k_A$; $G_\phi(z)=k_\phi$; $G_\theta(z)=k_\theta$; $k_d$ is the gain of the derivative feedback of the PID controller. Faults in the actuator, the plant, the velocity sensor and the position sensor are simulated by either emulators' gains or all-pass filters; $E_1(z)=\gamma_1$; $E_2(z)=(\gamma_2+z^{-1}/1+\gamma_2 z^{-1})$ (emulator is a first-order all-pass filter); $E_3(z)=\gamma_3$; and $E_4(z)=\gamma_4$, respectively. The emulator parameters $\gamma_1, \gamma_2, \gamma_3$ and $\gamma_4$ form the diagnostic parameters. The model parameters are $k_1=1, k_p=0.05; h_1=1; g_1=0.1$; the emulator (or diagnostic) parameters are varied only during the off-line identification to estimate the influence vectors, and during the normal operating phase their parameters are chosen such that they have a negligible effect on the dynamic behavior of the system. During the normal operating phase, their nominal values are set equal to unity, i.e. $\gamma_i^o=1, i=1, 2, 3$ and 4.

The state-space model of the position control system is given by $$x(k+1) = \quad (35)$$

$$\begin{bmatrix} 1 & k_2 & 0 & 0 \\ 0 & \alpha & k_1 k_A & 0 \\ -h_1 k_p k_0 \gamma_4 \gamma_1 & -h_1 k_\omega k_d \gamma_1 \gamma_3 - k_2 h_1 k_\theta k_p \gamma_1 \gamma_4 & -\gamma_2 & k_1 h_1 \gamma_1 \\ -k_\theta \gamma_4 & -k_2 k_\theta \gamma_4 & 0 & 1 \end{bmatrix} x(k) + \begin{bmatrix} 0 \\ 0 \\ h_1 \gamma_1 k_p \\ 1 \end{bmatrix} r(k) + \begin{bmatrix} 0 \\ 1 \\ 0 \\ 0 \end{bmatrix} w(k)$$

$$y(k) = [k_\theta \gamma_4 \quad k_2 k_\theta \gamma_4 \quad 0 \quad 0] x(k) + v(k)$$

Model Order Selection

The reference input was chosen to be a random noise so that the input would be persistently exciting. The model order was selected to be 3 using the present disclosure's model order selection scheme (see: J. R. Doraiswami, L. Cheded, M. Khalid, Model order selection criterion with application in physical systems, in: Conference on Automation Science and Engineering, Case 2010, Toronto, Canada, 2010-incorporated herein by reference), even though the true order was 4, so as to improve the condition number of the data matrix.

Fault Detection

In the fault detection strategy of the present disclosure, the threshold to be used was chosen to be that of an arbitrary reference input. Thus, as described in (26), the test statistics for such an arbitrary reference input is $$t_s(e) = \frac{1}{N} \sum_{i=k-N+1}^{k} e^2(i).$$

Figure 2:
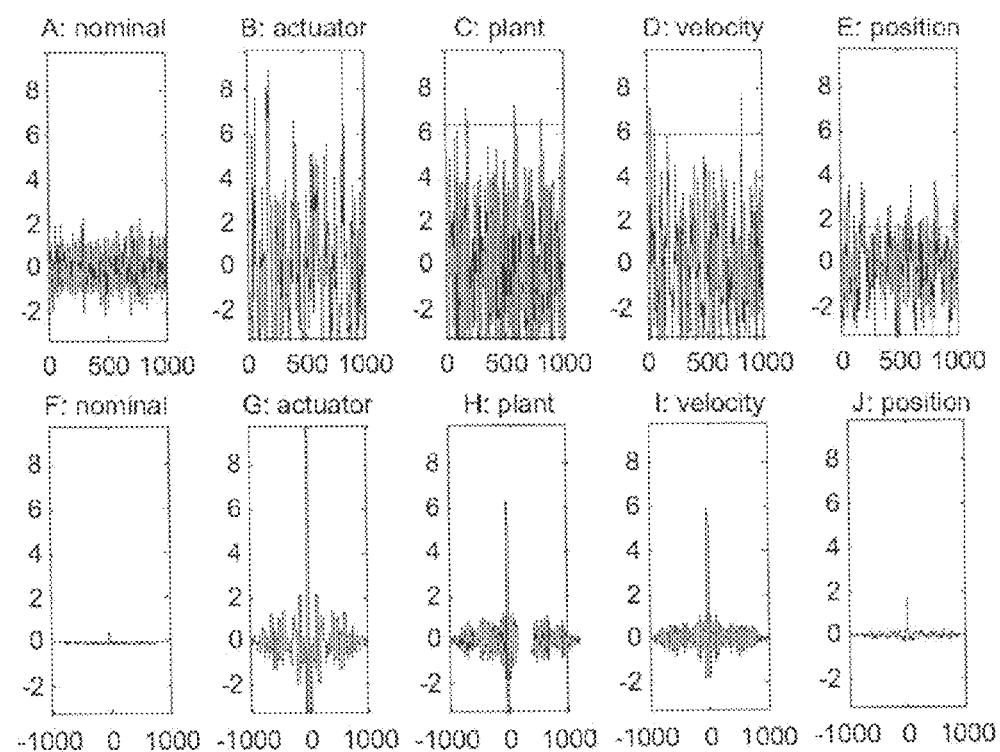
FIG. 2 illustrates a non-limiting example of the residuals and their auto-correlations for the fault-free (nominal) and faulty scenarios, according to certain embodiments.

FIG. 2 shows the Kalman filter residual and its auto-correlation for (a) nominal (i.e. fault-free), (b) actuator fault, (c) plant fault, (d) velocity sensor fault, and (e) the position sensor fault. The fault ratios, which are the ratios of the actual to the nominal diagnostic parameters, are as follows: 0.4, 1.4, 0.5 and 0.5 for (b), (c), (d) and (e), respectively. The test statistics is the lowest and the auto-correlation is that of a zero-mean white noise for the fault-free case. In FIG. 2, sub-figures A, B, C, D and E show the residual and its statistics ($t_s(e)$) in green horizontal lines, whereas sub-figures F, G, H, I and J show the corresponding auto-correlations. The system and measurement noise variances have been set to Q=R=0.5.

Fault Isolation

The influence vectors $\{\Omega_i\}$ for the actuator, plant, velocity sensor and position sensor were estimated by perturbing the diagnostic parameters one-at-time during the off-line identification phase. During the operating phase, the faults were isolated using the Bayes decision strategy (36) and (37).

Figure 3:
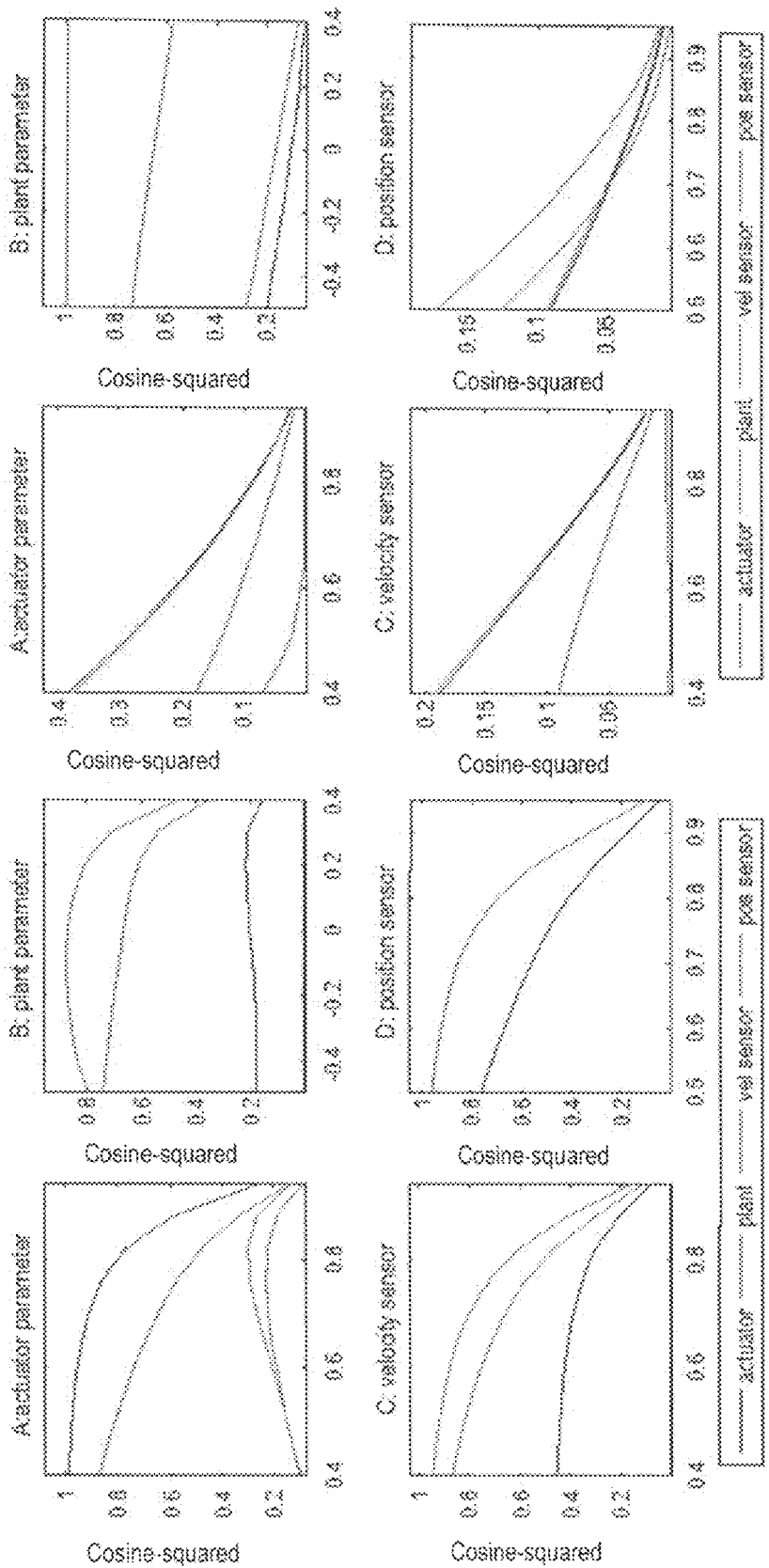
FIG. 3 illustrates a non-limiting example of plots of $\cos^2 \phi_i(k)$ when the diagnostic parameters $\gamma_1$ are varied to induce faults through emulators: high SNR (left 4 sub-figures) and Q=R=0.5 (right 4 sub-figures), according to certain embodiments.

The sub-figures A, B, C and D of FIG. 3 show the plot of $\cos^2 \phi_i(k)$ vs. $\gamma_i$ for faults in the actuator, the plant, the velocity sensor and the position sensor, respectively, when these faults were induced through the emulators. These 4 right-hand side sub-figures A, B, C and D of FIG. 3 were generated by setting Q=R=0.5 while those on the left-hand side show the case when the SNR is high. Any of the four subsystems (actuator, plant, velocity sensor and position sensor) is asserted as faulty if its associated $\cos^2 \phi_i(k)$ is maximum at $\gamma_i$. Note that the actuator and velocity sensor faults are difficult to isolate as the corresponding cosine squared values are very close. However, in high SNRs, all faults can be isolated as the $\cos^2 \phi_i(k)$—plots are well separated while in low SNRs, these plots are close to each other, hence making low SNR-based fault isolation difficult.

When the fault sizes are very small, that is, when their diagnostic parameters $\gamma_i$ are very close to each other, it is then difficult to isolate them in the presence of noise. However, thanks to the use of Kalman filter to generate the residual, the size of the faults that can be isolated is smaller than the one dealt with in the conventional schemes described in Section 3.2.

Figure 4:
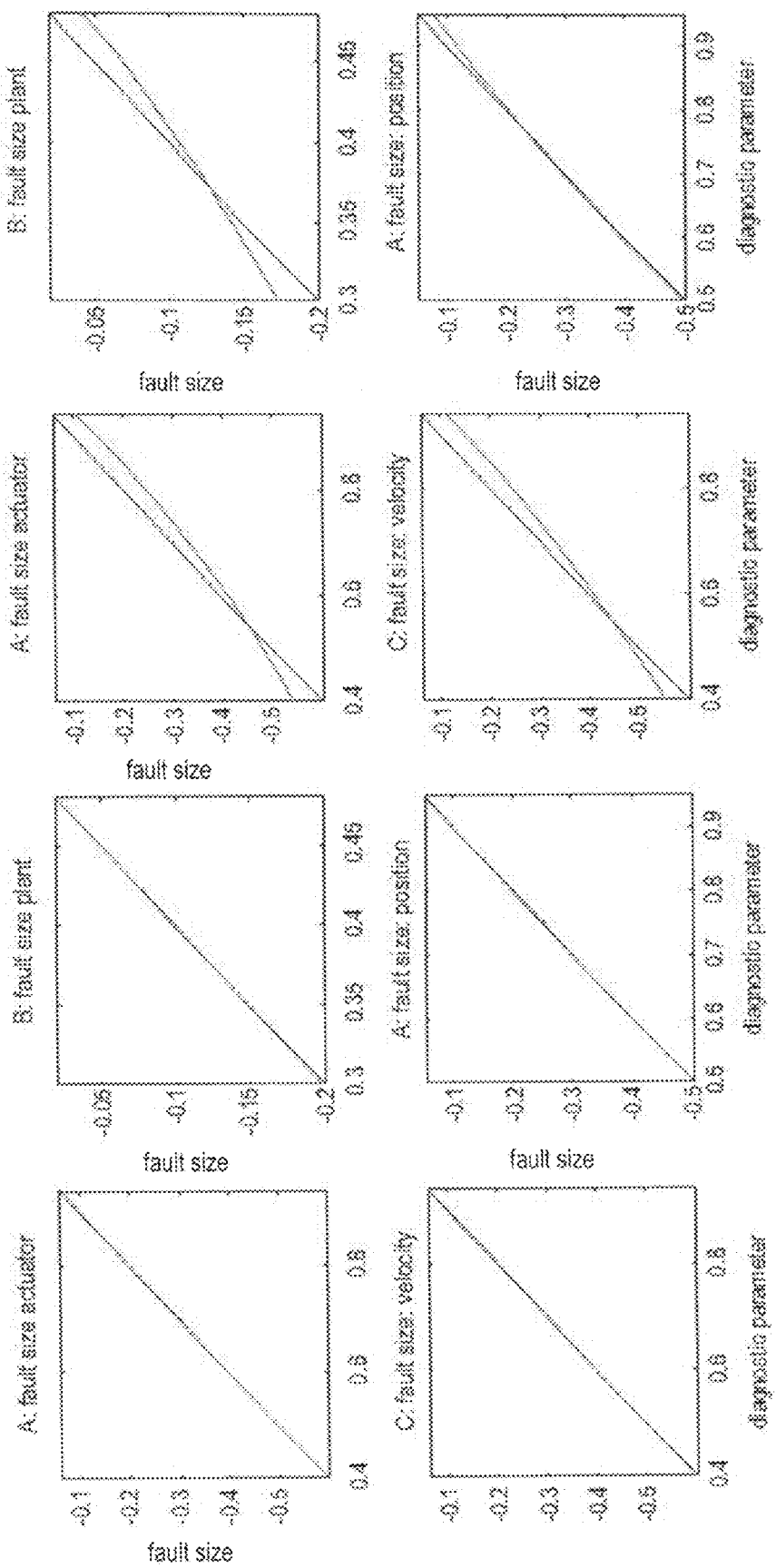
FIG. 4 illustrates a non-limiting example of true and estimated fault sizes. The figures on the left and the right show respectively fault sizes for Q=R=0 and Q=R=0.001, according to certain embodiments.

Fault Size Estimation:

A number of physical parameter-perturbed experiments were performed. Each experiment consists of varying the emulator parameters $\gamma_1, \gamma_2, \gamma_3$ and $\gamma_4$ independently. The fault size for the actuator, plant, the velocity sensor and the position sensor were varied respectively in the ranges $\Delta\gamma_{10}=-0.6:-0.06$, $\Delta\gamma_{20}=-0.2:-0.02$, $\Delta\gamma_{30}=-0.6:-0.6$: $-0.06$ and $\Delta\gamma_{40}-0.6:-0.06$ where the nominal diagnostic parameters were $\gamma_{10}=1, \gamma_{20}=-5, \gamma_{30}=1.0, \gamma_{40}=1.0$, and the data of the fault sizes and their estimates were recorded. Sub-figures A, B, C and D of FIG. 4 respectively show the variation of the true fault size $\{\Delta\gamma_j(k)\}$ and the estimated fault size $\{\Delta\hat{\gamma}_j(k)\}$ as the diagnostic parameters of the actuator ($\gamma_1$), the plant parameter ($\alpha$), the velocity sensor ($\gamma_3$) and position sensor ($\gamma_4$) change. The estimated and true fault sizes are shown on the 4 left-hand side graphs of FIG. 4, for Q=R=0 and, on the 4 right-hand side graphs for Q=R=0.1. Note that the true fault size is shown in FIG. 4 by a straight line for all cases.

Evaluation of the United Scheme on a Physical Process Control System

Figure 5:
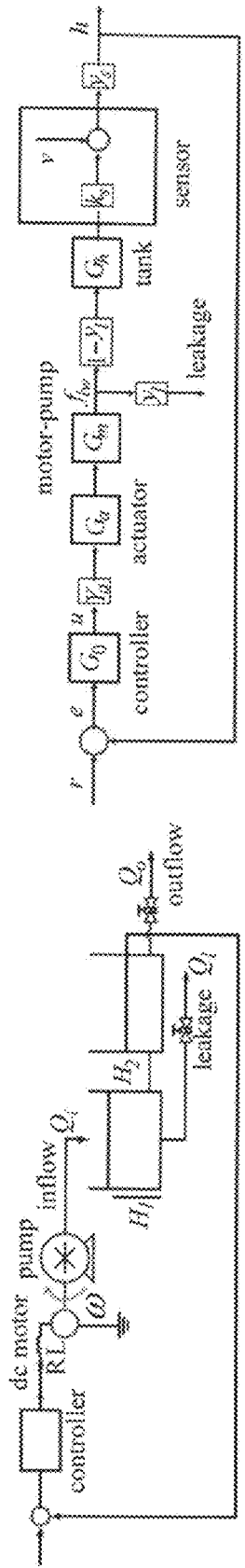
FIG. 5 illustrates a non-limiting example of two-tank fluid control system (left) and its block diagram representation (right), according to certain embodiments.

The physical system under evaluation is a laboratory-scale process control system formed of two tanks connected by a pipe. The fluid control system is formed of a PID controller $G_0$, a DC motor-driven pump $G_m$ which supplies the fluid to the first tank and a PI controller is used to control the fluid level in the second tank by maintaining the water height at a specified level. The transfer function $G_h$ models the tanks. The measurements include the height h(k), the control input u(k) to actuator and the reference input r(k), the input to the tank is the flow rate $f_{lw}$(k). FIG. 5 shows the fluid level system on the left, and, on the right, it shows the block diagram relating the reference input r(k) and the height of the water level h(k).

A step input is applied to the dc motor-pump system to fill the first tank. First the fault-free model is identified using a recursive least-squares identification scheme. The identified model is essentially a second-order system with a delay even though the theoretical model is of a fourth order. Such a discrepancy is due to the inability of the identification scheme to capture the system's fast dynamics, especially in low-SNR scenarios. Using the fault-free model together with the covariance of the measurement noise, R, and the plant noise covariance, Q, the Kalman filter model was finally derived. To obtain an estimate of the plant covariance, Q, a number of experiments were performed under different plant scenarios to tune the Kalman gain K to obtain an optimal performance which ensures the generation of a white noise residual with a minimal variance. Various types of faults, including the leakage, actuator fault, liquid-level sensor fault and the flow sensor fault, were all introduced. These faults were emulated by varying $\gamma_l$ for the opening of the drainage valve that causes a leakage fault, varying the gain block $\gamma_a$ connected to the actuator input, and varying $\gamma_s$ connected to the liquid-level sensor output. The National Instruments LABVIEW package was employed to collect these data.

Model of the Two-Tank System

The control input to the motor, u, and the flow $Q_i$ are related by a first-order nonlinear equation $$\dot{Q}_i + -a_m Q_i + b_m \phi(u) \quad (36)$$

Where $a_m$ and $b_m$ are the parameters of the motor-pump subsystem and $\phi(u)$ is a dead-band and saturation-type of nonlinearity. The Proportional and Integral (PI) controller is given by $$\dot{x}_3 = e = r - h_2$$

$$u = k_p e + k_I x_3 \quad (37)$$

Where $k_p$ and $k_I$ are the PI controller's gains and r is the reference input. With the inclusion of the leakage, the liquid level system is now modeled by $$A_1 \frac{dH_1}{dt} = Q_i - C_{12}\varphi(H_1 - H_2) - C_l\varphi(H_1) \quad (38)$$

$$A_2 \frac{dH_2}{dt} = C_{12}\varphi(H_1 - H_2) - C_0\varphi(H_2)$$

where $\phi(.)=\text{sign}(.)\sqrt{2g(.)}$, $Q_l = C_{l\sqrt{}}(H_1)$ is the leakage flow rate, $Q_0 = C_{0\phi}(H_2)$ is the output flow rate, $H_1$ is the height of the liquid in tank 1, $H_2$ the height of the liquid in tank 2, $A_1$ and $A_2$ the cross-sectional areas of the 2 tanks, g=980 cm/s² the gravitational constant, and $C_{12}$ and $C_o$ the discharge coefficients of the inter-tank and output valves, respectively. The linearized state-space model of the entire system is given by $$\dot{x} = Ax + Br \quad (39)$$

$$y = Cx$$

where x, A, B and C are given by $$x = \begin{bmatrix} h_1 \\ h_2 \\ x_3 \\ q_i \end{bmatrix}, A = \begin{bmatrix} -a_1 - \alpha & a_1 & 0 & b_1 \\ a_2 & -a_2 - \beta & 0 & 0 \\ -1 & 0 & 0 & 0 \\ -b_m k_p & 0 & b_m k_1 & -a_m \end{bmatrix},$$

$$B = [0 \ 0 \ 1 \ b_m k_p]^T,$$

$$C = [1 \ 0 \ 0 \ 0]$$

$q_i$, $q_l$, $q_0$, $h_1$ and $h_2$ are respectively the increments in $Q_i$, $Q_l$, $Q_0$, $H_1^0$ and $H_2^0$, whereas $a_1$, $a_2$, $\alpha$ and $\beta$ are parameters associated with the linearization process, a is the leakage flow rate, $q_l = \alpha h_1$, and $\beta$ is the output flow rate, and $q_0 = \beta h_2$.

Results of Evaluation

Figure 6:
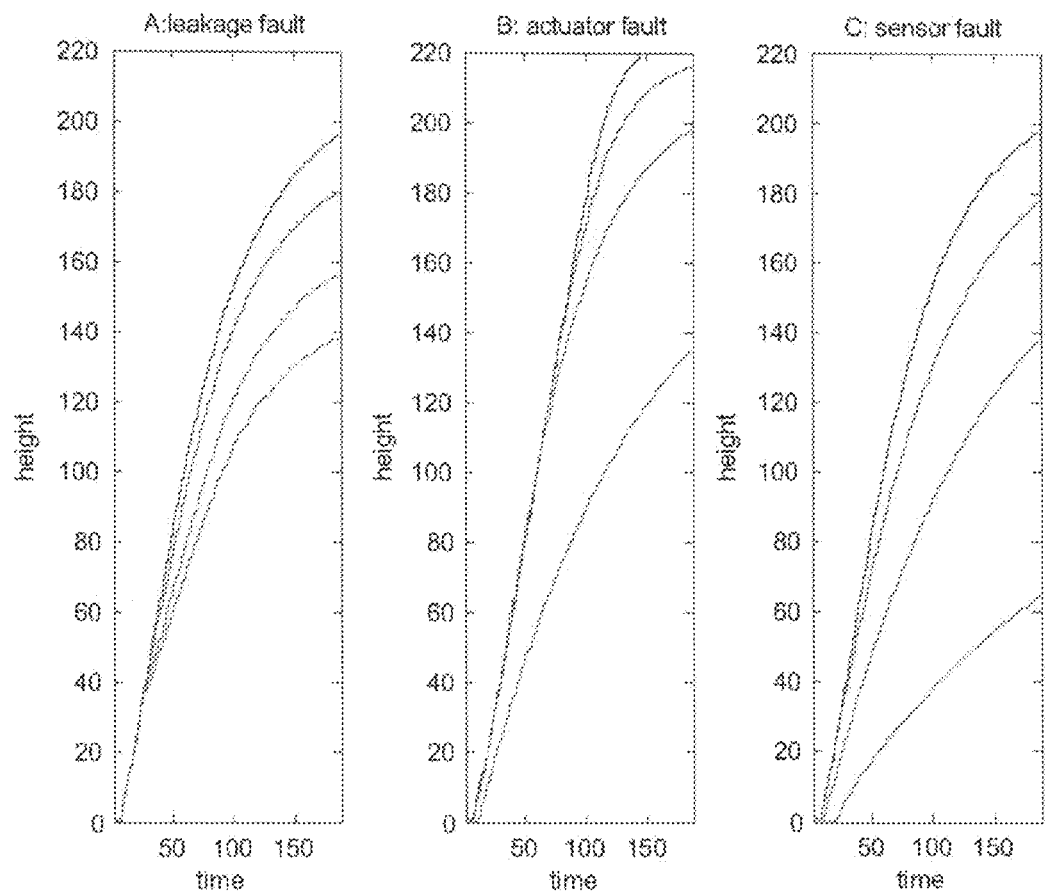
FIG. 6 illustrates a non-limiting example of liquid level for normal and fault scenarios, according to certain embodiments.

The reference input was chosen to be a step input. An off-line perturbed-parameter experiment was performed to estimate the influence vector. Using the present disclosure's model selection criterion, the model order was selected to be 2 even though the true order was 4 to improve the condition number of the data matrix. The physical two-tank fluid system is nonlinear with a dead-band nonlinearity and fast dynamics. The identified model order is different from that of the model derived from the physical laws. The conventional two-stage identification scheme based on first identifying y and then deriving $\gamma = \phi^{-1}(\theta)$ is not possible because of the irreversible collapse of the model structure from a fourth-order one to a second-order one. This difficulty is avoided by adopting a scheme wherein a number of offline experiments on the physical system are performed by varying the diagnostic parameters so as to capture the influence of the diagnostic parameters on the input-output behavior reliably. This in essence mirrors the use of a neural network in approximating a nonlinear map. FIG. 6 shows the plots of the step responses when the diagnostic parameters $\gamma_l$, $\gamma_a$ and $\gamma_s$, were varied one at a time to induce leakage, actuator and sensor faults. The sub-figures A, B, and C in FIG. 6 show the leakage faults, actuator faults and sensor faults induced by varying $\gamma_l$, $\gamma_a$ and $\gamma_s$, respectively. These 3 plots show the normal and faulty cases. Small, medium and large faults were simulated by varying the diagnostic parameters by 25%, 50% and 75% respectively and are shown respectively by green, red and turquoise color. The normal case is shown in blue.

Fault Detection

Figure 7:
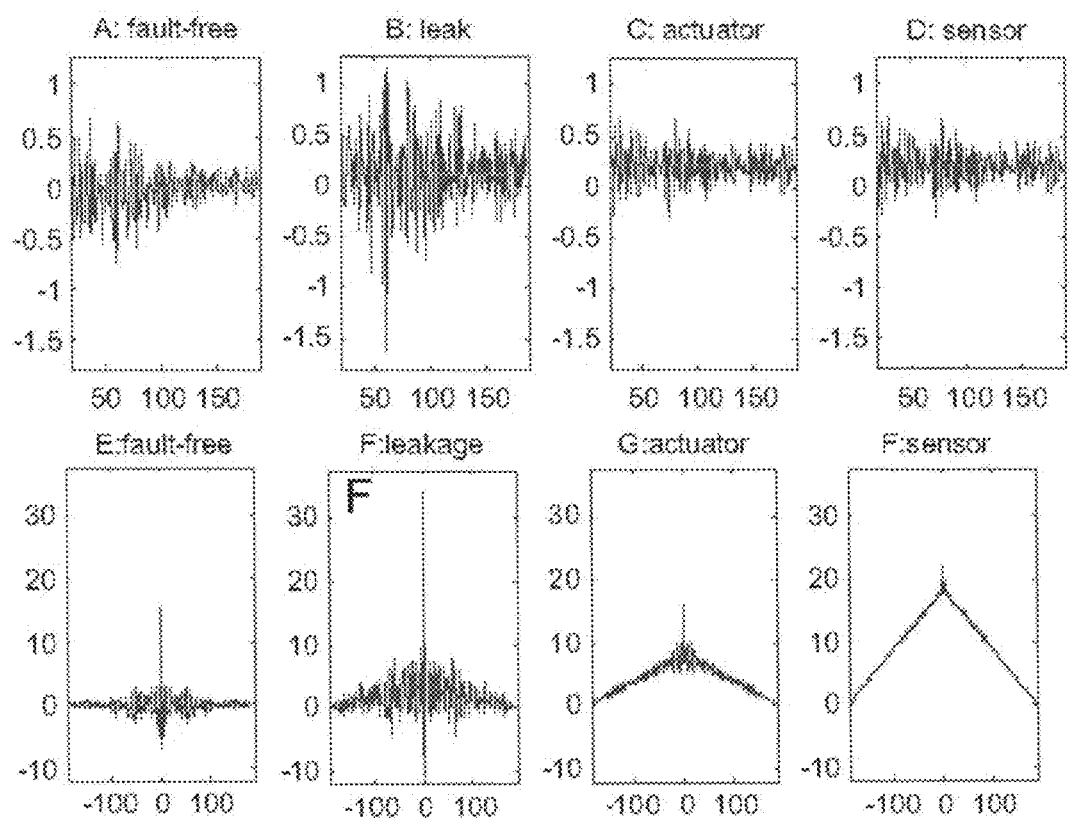
FIG. 7 illustrates a non-limiting example of the residuals and their auto-correlations for the fault-free and faulty scenarios, according to certain embodiments.

The fault detection strategy of (26) with a constant input was employed here. The test statistic $$t_s(e) = \left| \frac{1}{N} \sum_{i=k-N+1}^{k} e(i) \right|$$

was employed for fault detection. FIG. 7 shows the Kalman filter residual and its auto-correlation for the following cases: (a) nominal (or fault-free), (b) leakage fault, (c) actuator fault and (d) sensor fault. The test statistic value is the lowest and the auto-correlation is that of a zero-mean white noise for the nominal (fault-free) case. The sub-figures A-D of FIG. 7 show the residuals and their test statistics shown as straight lines, whereas the sub-figures E-H show the corresponding auto-correlations.

Fault Isolation

Figure 8:
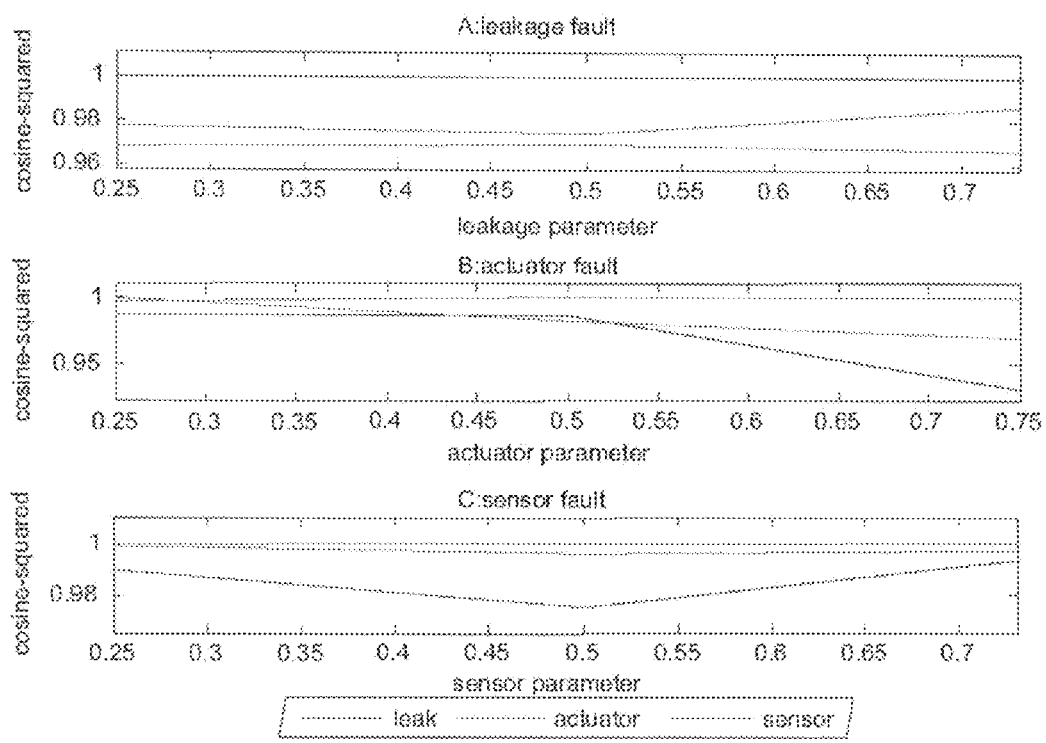
FIG. 8 illustrates a non-limiting example of plots of $\cos^2 \phi_i$ (k) vs. $\gamma_i$ for leakage, actuator and sensor faults when $\gamma_i$: i=1, 2, 3, are varied, according to certain embodiments.

The influence vectors $\{\Omega_i\}$ for the leakage, actuator and sensor faults were estimated by perturbing the diagnostic parameters one-at-time during the off-line identification phase. During the operating phase, the faults were isolated using the Bayes decision strategy given in (32). As done before, the leakage, actuator and sensor faults were all introduced by varying the diagnostic parameter $\gamma_1$, $\gamma_2$ and $\gamma_3$. Three values for $\gamma_i$: i=1, 2, 3 were chosen, namely 0.25, 0.50 and 0.75, with the nominal value $\gamma_i^0=1$, to simulate 'small', 'medium' and 'large' faults, respectively. The Bayes decision strategy was employed to assert the fault type, i.e., either leakage or actuator or sensor fault, by computing their 3 quantities $\cos^2 \phi_i(k)$, i=1, 2, 3 associated with the leakage fault, actuator fault and sensor fault, respectively. The decision on which fault is asserted to have occurred is made based on which $\cos^2 \phi_i(k)$ is maximum, i.e. the leakage fault is asserted if i=1, actuator fault if 1=2 and sensor fault if i=3. FIG. 8 shows the plot of $\cos^2 \phi_i(k)$ vs. $\gamma_i$ for leakage, actuator and sensor faults when $\gamma_i$:i=1, 2, 3 were varied as described above. The maximum values of $\cos^2 \phi_i(k)$ were normalized to unity. The sub-figures A, B and C in FIG. 8 show the results of $\cos^2 \phi_i(k)$ for the leakage, actuator and sensor faults, respectively. The maximum values of the "cos" quantities are used to accurately isolate the faults. The leakage fault may easily be isolated from the rest of the faults while it is not so for both the actuator and sensor faults as their $\cos^2 \phi_i(k)$ values are very close to each other.

Comment: When two subsystems are connected in cascade, other diagnostic parameters, besides the constant emulator gain, may be selected and added to distinguish faults affecting one subsystem from those affecting the other.

Evaluation of the Unified Scheme on a Physical Position Control System

Figure 9:
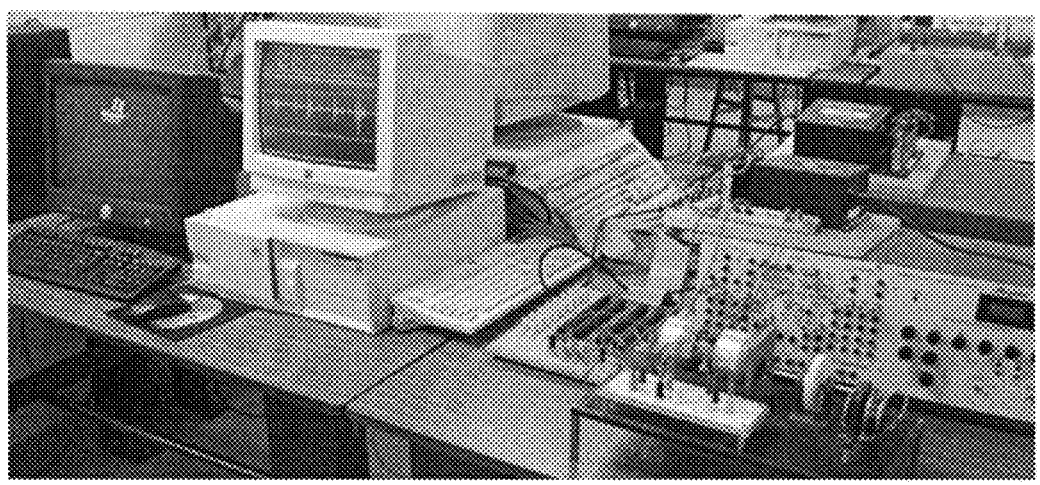
FIG. 9 illustrates a non-limiting example of a physical closed-loop position control system, according to certain embodiments.
Figure 9:
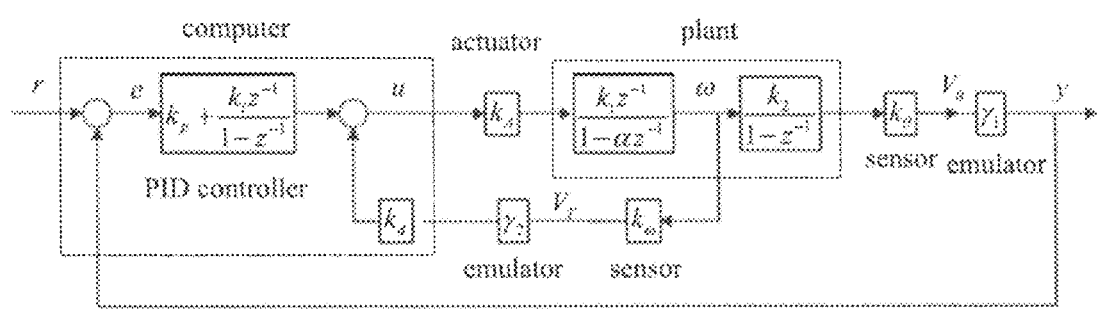

The proposed scheme was evaluated on a laboratory-scale physical position control system shown in FIG. 9 to detect and isolate faults in the position and velocity sensors. The top figure shows the photograph of the laboratory setup whereas the bottom one shows the block diagram of the physical position system. The physical position servo-system consists of a PWM amplifier, a DC motor, tachometer, a position encoder, and a voltage divider. The digital-to-analog converter, D/A, the analog-to-digital converter, A/D, and the quadrature-phase position decoder permit data exchange with computers. MATLAB real-time workshop is used to implement the fault diagnosis scheme in a real-time environment. The host PC is employed to implement the fault diagnosis using MATLAB. The target PC is interfaced to an A/D and D/A converter I/O board termed Data Translation DT 2821. The host PC downloads the executable code of the Simulink model in C++ to the target PC. The target PC executes the code in real-time using the sampled input from the A/D converter and the discrete-time filter output is fed to the D/A converter.

The fault diagnosis scheme focuses mainly on the position and velocity sensor faults. The diagnostic parameters to emulate sensor fault effects were selected to be the gains $\gamma_1$ and $\gamma_2$ for the position sensor and velocity sensor, respectively. Faults were introduced by varying the diagnostic parameter around their nominal values of unity, i.e. around $\gamma_1^0=1$ and $\gamma_2^0=1$. A digital PID controller was implemented on a PC using real-time rapid prototyping environment, namely Matlab Real-time workshop. The outputs $V_\theta$ and $V_T$ were acquired by analog-to-digital converters (ADC) and the control input u generated by the digital controller drives the PWM amplifier interfaced to a digital-to-analog converter (DAC).

In general, a physical system is highly complex and non-linear and, as such, defies mathematical modeling and this physical system is no exception. The PWM amplifier exhibits a saturation-type nonlinearity and further, the tachometer-based velocity sensor is very noisy. The main difficulty in identifying the model of a physical system is the determination of a suitable structure (the orders of the numerator and the denominator polynomials and the delay). The structure based on the model derived from the physical laws may not capture the dynamic behavior of the physical system. To overcome this problem, we use a simple and straightforward scheme based on Akaike Information Criterion and another novel. The model order was chosen to be high with a value of 20.

Results from Evaluations

Figure 10:
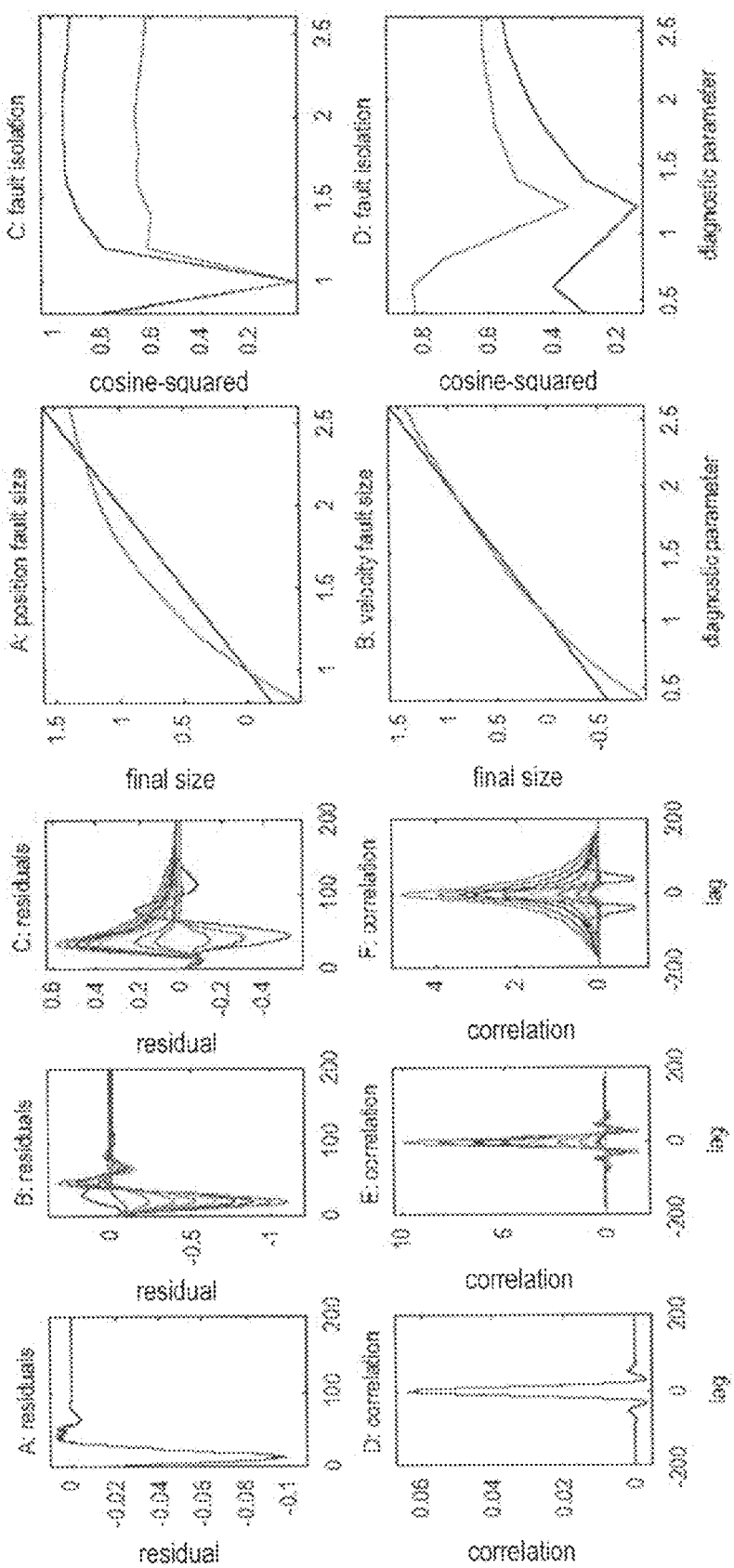
FIG. 10 illustrates a non-limiting example of residuals and their correlations (left); fault sizes and fault isolation (right), according to certain embodiments.

A number of physical parameter-perturbed experiments were performed. Each experiment consists of varying the emulator parameters $\gamma_1$ and $\gamma_2$ independently and recording the data of (a) the residual of the Kalman filter, (b) the auto-correlation of the residual, (c) the estimated values of the fault sizes $\Delta_{\gamma 1}$ and $\Delta_{\gamma 2}$, and $\cos^2 \phi_i(k)$. The range of variations in the diagnostic parameter $\Delta_{\gamma 1}$ was (−0.2:1.8), while the range of variations in $\Delta \gamma_2$ was (−0.6:1.6). Sub-figures A, B and C at the top left of FIG. 10 show respectively the residuals for (a) the nominal fault-free case, (b) when the diagnostic parameter $\gamma_1$ associated with the position sensor is varied and (c) when the diagnostic parameter $\gamma_2$ associated with the velocity is varied, while sub-figures D-F at the bottom left of FIG. 10 show the auto-correlations of these residuals. Similarly, sub-figures B show the true velocity fault size $\Delta_{\gamma 2}$ (k) and its estimated version $\Delta_{\hat{\gamma} 2}(k)$ when the diagnostic parameter $\Delta_{\gamma 2}$ is varied in the range −0.6:1.6. The gains $\gamma_1$ and $\gamma_2$ were varied and for each experiment. Sub-figures A-C at the top left of FIG. 10 show respectively the residuals for (a) the nominal fault-free case, (b) when the diagnostic parameter $\gamma_1$ associated with the position sensor is varied and (c) when the diagnostic parameter $\gamma_2$ associated with the velocity is varied, while sub-figures D-F at the bottom left of FIG. 10 show the auto-correlations of these residuals. Note that the in the presence of a fault, the residual is not a zero-mean white noise process and hence its correlation function is not a delta function. Sub-figures C and D on the right-hand side of FIG. 10 respectively show $\cos^2 \phi_i(k)$ (shown in blue) and $\cos^2 \phi_2(k)$ (shown in green) when $\gamma_1$ and $\gamma_2$ are varied so as to respectively induce a position and a velocity sensor fault. These sub-figures clearly show that the faults are correctly isolated for all diagnostic parameter variations. For a correctly-isolated fault, the associated fault size estimate is also shown as indicated in sub-figures A on the right-hand side of FIG. 10. This figure depicts both the true position fault size $\Delta_{\gamma 1}$ (k) and its estimated version $\Delta_{\hat{\gamma} 2}(k)$ when the diagnostic parameter $\Delta_{\gamma 1}$ is varied in the range (−0.2:1.8). Similarly, sub-figures B show the true velocity fault size $\Delta_{\gamma 2}(k)$ and its estimated version $\Delta_{\hat{\gamma} 2}(k)$ when the diagnostic parameter $\Delta_{\gamma 2}$ is varied in the range (−0.6:1.6).

Some Remarks on the Selected Model Order

The model order selection is crucial to fault isolation. The lower the model order is, the lower the performance of the fault isolation becomes. The model order was selected in such a way that it is "just high enough" to incorporate sufficient differentiating dynamics to allow for a successful isolation of the faults. Model orders 3-25 were selected. For each selected order, the fault isolation capability was evaluated from $\{\cos^2 \phi_i(k)\}$ plots. It was found that as the number of diagnostic parameters, and the range over which they were varied, get larger, the order model required to ensure correct fault isolation, especially in the presence of noise and nonlinearities, becomes higher as it needs to capture sufficient dynamics to mitigate the combined adverse effects of measurement noise, nonlinearities and the noise induced by the variations of diagnostic parameters. In the present disclosure, a model order of 20 was found to be just high enough to accommodate the variations in the three diagnostic parameters in the range 25-75%. However, it was also found that for orders higher than 20 and due to the over-fitting effect, the required estimates also captured noise artifacts, thus exhibiting a noisy map relating the parameter variation $\Delta_{ij}$ and its estimate $\Delta_{\hat{ij}}(k)$ Proof of Lemma 1

Recall that Lemma 1 states that the residual of the Kalman filter is given by $$e(z) = \frac{D_0(z)}{F_0(z)} y(z) - \frac{N_0(z)}{F_0(z)} r(z) \qquad (40)$$

where $(D_0(z)/F_0(z)) = I - C_0(zI - A_0 + K_0 C_0)^{-1} K_0;$ $(N_0(z)/F_0(z)) = C_0(zI - A_0 + K_0 C_0)^{-1} B_0.$ Proof.

Expressing the state-space model of the system in the z-domain yields $\hat{x}(z) = (zI - A_0 + K_0 C_0)^{-1} B_0 r(z) + (zI - A_0 + K_0 C_0)^{-1} K_0 y(z)$
$e(z) = y(z) - C_0 \hat{x}(z)$ (41)

By expressing the residual e(z) in terms of r(z) and y(z), we get $e(z) = (I - C_0(zI - A_0 + K_0 C_0)^{-1} K_0) y(z) - C_0(zI - A_0 + K_0 C_0)^{-1} B_0 r(z)$ (42)

The following identity is needed in subsequent derivations:

$$(C(zI - A)^{-1} B + D)^{-1} = \frac{\left\| \begin{matrix} zI - A & B \\ -C & D \end{matrix} \right\|}{|zI - A|} \qquad (43)$$

where $|(.)|$ denotes determinant of $(.)$, the matrix A is n×n, vector B is n×1, vector C is 1×n, and D is a scalar. Consider $I - C_0(zI - A_0 + K_0 C_0)^{-1} K_0$. Using the matrix identity given by (43) we get $$I - C_0(zI - A_0 + K_0 C_0)^{-1} K_0 = \frac{\left\| \begin{matrix} zI - A_0 + K_0 C_0 & K_0 \\ C_0 & I \end{matrix} \right\|}{|zI - A_0 + K_0 C_0|} \qquad (44)$$

Consider the square bracket on the upper right-hand-side of (44). As the determinant does not change by elementary operation on its rows and columns, post-multiplying the second row by $K_0$ and adding the result to the first row yields $$I - C_0(zI - A_0 + K_0 C_0)^{-1} K_0 = \frac{\left\| \begin{matrix} zI - A_0 & 0 \\ C_0 & I \end{matrix} \right\|}{|zI - A_0 + K_0 C_0|} \qquad (45)$$

$$I - C_0(zI - A_0 + K_0 C_0)^{-1} K_0 = \frac{D_0(z)}{F_0(z)} \qquad (46)$$

where $D_0(z) = |zI - A_0|$, $F_0(z) = |zI - A_0 + K_0 C_0|$. Consider the matrix $C_0(zI - A_0 + K_0 C_0)^{-1} B_0$. Using the matrix identity (43) we get $$C_0(zI - A_0 + K_0 C_0)^{-1} B_0 = \frac{\left\| \begin{matrix} zI - A_0 + K_0 C_0 & B_0 \\ C_0 & 0 \end{matrix} \right\|}{|zI - A_0 + K_0 C_0|} \qquad (47)$$

Consider the upper term in the square bracket on the right-hand-side of (50). As the determinant does not change by elementary operation on its rows and columns, post-multiplying the second row by $K_0$ and subtracting the result from the first row yields $$C_0(zI - A_0 + K_0 C_0)^{-1} B_0 = \frac{\left\| \begin{matrix} zI - A_0 & B_0 \\ C_0 & 0 \end{matrix} \right\|}{|zI - A_0 + K_0 C_0|} \qquad (48)$$

$$C_0(zI - A_0 + K_0 C_0)^{-1} B_0 = \frac{N_0(z)}{F_0(z)} \qquad (49)$$

where $N_0(z) = \left\| \begin{matrix} zI - A_0 & B_0 \\ C_0 & 0 \end{matrix} \right\|$ Substituting (46) and (49) in (42) leads to (52).

Proof of Lemma 2

Recall that Lemma 2 states that $$e(z) = \frac{1}{F_0(z)} (\psi^T(z) \Delta \theta + v(z)) \qquad (50)$$

where $\psi(z)$ is the z-transform of $\psi(k)$, given by $\psi^T(z) = [-z^{-1} y(z) - z^{-2} y(z) \ldots -z^{-n_a} y(z) z^{-1} r(z) z^{-2} r(z) \ldots z^{-n_b} r(z)]$ (51)

and $\Delta \theta$ is given by $\Delta \theta = \theta - \theta^0$.

Proof.

Consider the expression of the residual $$e(z) = \frac{D_0(z)}{F_0(z)} y(z) - \frac{N_0(z)}{F_0(z)} r(z) \qquad (52)$$

Substituting for $D_0(z) = 1 + \sum_{i=1}^{n_d} a_{i0} z^{-i}$ and (53)

$N_0(z) = \sum_{i=1}^{n_b} b_{i0} z^{-i}$, we get $$F_0(z) e(z) = y(z) + \sum_{i=1}^{n_d} a_{i0} z^{-i} y(z) - \sum_{i=1}^{n_b} b_{i0} z^{-i} r(z)$$

The z-transform $\psi^T(z)$ of $\psi^T(k)$ is $\psi^T(z) = [-z^{-1} y(z) - z^{-2} y(z) \ldots -z^{-n_a} y(z) z^{-1} r(z) z^{-2} r(z) \ldots z^{-n_b} r(z)]$ (54)

Using (54) expression (53) becomes $F_0(z) e(z) = y(z) - \psi^T(z) \theta_0$ (55)

The z-transform $y(z) = \psi^T(z) \theta + v(z)$ of (56)

$y(k) = \psi^T(k) \theta + v(k)$ we get $F_0(z) e(z) = \psi^T(z) \Delta \theta + v(z)$ where $\Delta \theta = \theta - \theta^0 = [\Delta a_1 \quad \Delta a_2 \quad . \quad \Delta a_{n_a} \quad \Delta b_1 \quad \Delta b_2 \quad . \quad \Delta b_{n_b}]^T$ □.

Bayesian Multiple Composite Hypotheses Testing Problem
Consider the following linear algebraic model:

$$e(k) = \psi^T(k)\Omega_i \Delta\Delta_i + e_0(k) \quad (57)$$

where $e(k)$ is an $N\times 1$ vector. $e_0(k)$ an $N\times 1$ zero-mean Gaussian random variable. $\psi^T(k)\Omega_i$ an $N\times 1$ vector, and $\Delta\gamma_i$ a scalar. Let the Bayesian error measure $J_j$ be $$J_j = (e(k) - \psi^T(k)\Omega_j \Delta\gamma_j(k))^T(e(k) - \psi^T(k)\Omega_j\Delta\gamma_j(k)) \quad (58)$$

The optimal solutions for (a) the index l of the most likely hypothesis $H_l$, (b) the best least-squares estimate $\Delta\hat{\gamma}_l(k)$ of the unknown diagnostic parameter variation $\Delta\gamma_l(k)$ (a size of the fault) and (c) the optimal error measure $J_l^*$ are respectively as follows:

$$l = \arg\left\{\min_j J_j\right\} \quad (59)$$

$$\Delta\hat{\gamma}_l(k) = (\psi^T(k)\Omega_l)^\dagger e(k) \quad (60)$$

$$J_l^* = \min_j J_j = \|e(k)\|^2(1 - \cos^2\varphi_j(k)) \text{ where} \quad (61)$$

$(.)^\dagger$ stands for the pseudo-inverse of $(.)$ and
$\cos^2\varphi_j(k) = [(\langle e(k), \psi^T(k)\Omega_j\rangle)/\|e(k)\|\|\psi^T(k)\Omega_j\|]^2$.

Proof.
The first step is to obtain a linear least-squares estimate $\Delta\hat{\gamma}_l(k)$ of the unknown $\Delta\gamma_l(k)$ using model(57). The estimate is given by $$\Delta\hat{\gamma}_j(k) = (\psi^T(k)\Omega_j)^\dagger e(k) = (\Omega_j^T\psi(k)\psi^T(k)\Omega_j)^{-1}\Omega_j^T\psi(k)e(k). \quad (62)$$

Substituting $\Delta\gamma_j(k)$ by $\Delta\hat{\gamma}_j(k)$ in the expression for $J_j$ yields the following optimal measure $J_j^*$:

$$J_j^* = (e(k) - \psi^T(k)\Omega_j(\psi^T(k)\Omega_j)^\dagger e(k))^T(e(k) - \omega^T(k)\Omega_j(\psi^T(k)\Omega_j)^\dagger e(k)) \quad (63)$$

Simplifying (59), $$J_j^* = e^T(k)(I - \psi^T(k)\Omega_j(\psi^T(k)\Omega_j)^\dagger)e(k) \quad (64)$$

Using the expression for the pseudo-inverse in (62), we get $$J_j^* = e^T(k)e(k) - e^T(k)\psi^T(k)\Omega_j(\Omega_j^T\psi(k)\psi^T(k)\Omega_j)^{-1}\Omega_j^T\psi(k)e(k) \quad (65)$$

As $(\Omega_j^T\psi(k)\psi^T(k)\Omega_j)^{-1}$ is a scalar, expressing it in terms of an inner product and a norm leads to $$J_j^* = \|e(k)\|^2\left(1 - \frac{|\langle e(k), \psi^T(k)\Omega_j\rangle|^2}{\|\psi^T(k)\Omega_j\|^2\|e(k)\|^2}\right) = \|e(k)\|^2(1 - \cos^2\varphi_j(k)) \; \square \quad (66)$$

Figure 11:
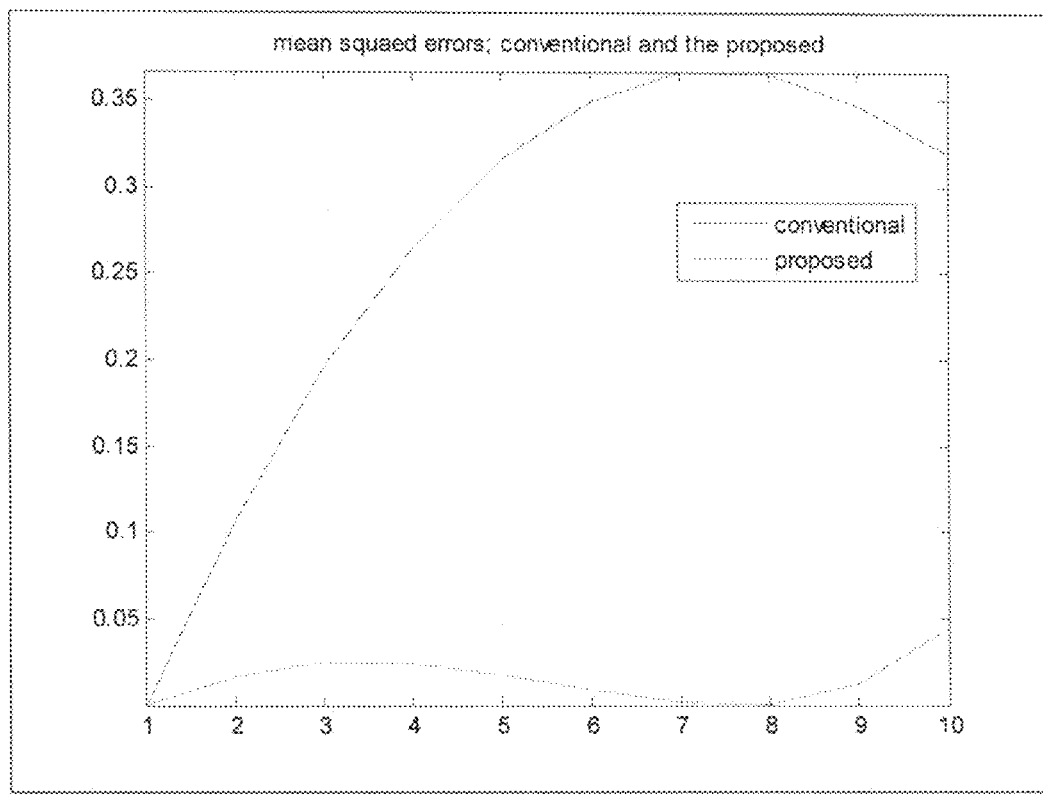
FIG. 11 illustrates a non-limiting example of mean-squared errors: according to the present disclosure (in green) and conventional (in maroon) schemes, according to certain embodiments.

FIG. 11 is a non-limiting example of the present disclosure that compares a) the reliable identified model of the present disclosure obtained by performing a number of experiments by perturbing the emulator parameters to cover likely operating regions in the neighborhood of, and including, a given operating point with b) the conventional identification scheme, where in the system is identified at the given operating point by performing one experiment. The scheme in the present disclosure outperforms the conventional scheme in that the mean-squared identification error is significantly lower over a wide range of operating regimes.

The present disclosure demonstrated the power and effectiveness of the Kalman filter in unifying the important dual aim of detecting and isolating faults in both simulated and physical systems. The filter's structure is error-driven, intuitive and, because of its closed-loop configuration, has an inherent ability to also attenuate disturbances. The whiteness property of the residual is explored here and shown to be very helpful in practice to verify the filter's performance as well as tune its gain. The present disclosure has also introduced the useful fault emulation scheme and diagnostic parameter concept, as well as introduced and exploited the powerful concept of the influence vector. This vector was shown to capture the variations in, and sensitivity to, the diagnostic parameters. The residual was also shown to follow a linear regression model with respect to the diagnostic parameter variations, thus easily lending itself to the widely-used and successful composite Bayes hypothesis testing scheme for fault isolation.

In one aspect, the present disclosure uses model-based approach to detect and isolate a simple fault, i.e., a fault in only one subsystem, and multiple faults in subsystems, i.e., simultaneous faults in two or more subsystems.

In another aspect, the present disclosure is geared towards meeting requirements such as a) detect and isolate incipient faults, b) estimate size of the fault, c) monitor performance d) develop condition-based maintenance, and e) implement soft sensor to replace fault-prone hardware sensor.

In another aspect, the present disclosure has following distinguishing features.

The present disclosure provides theoretical justification for the proposed fault detection and isolation. In one embodiment, the present disclosure proves the Kalman filter structure to be both necessary and sufficient for fault detection. In one embodiment of the present disclosure an influence vector is a partial derivative of the Kalman filter residual with respect to the parameters characterizing the subsystem and a sufficient condition for fault isolation is that the influence vectors associated with subsystems are linearly independent.

A test statistic derived from the Bayes' binary composite hypothesis test, is employed by the present disclosure for fault detection, whereas for fault isolation based on using Bayes' multiple composite hypothesis test, a fault discrimination function, which is function of the residual and its estimate computed from the influence vector, is derived. According to certain embodiments of the present disclosure, a subsystem is asserted to be faulty if the residual vector and its estimate are maximally aligned.

An accurate and reliable fault diagnosis is ensured in the present disclosure in the face of variations in the operating regimes and noise and disturbances that affect the system. The nominal model of the system embodied in the Kalman filter, and the influence vectors associated with the subsystems, are identified from the data obtained by emulating all likely operating regimes during off-line identification phase and on-line tuning of the Kalman gain whenever the residual exceeds a threshold value, which is determined from an acceptable performance metric.

The scheme in the present disclosure is evaluated on a number of simulated systems subject to noise and disturbances with low signal-to-noise ratios, and complex and non-linear physical systems.

In one aspect, the present disclosure is different from prior art in that the present disclosure provides theoretical justification for the fault diagnosis, is general and is not tailored for a specific class of systems, and the novelty is independent of evaluation on the specific systems.

In one aspect the present disclosure differs from prior art by of isolating fault in low signal to noise ratio. In another aspect, the present disclosure provides theoretical framework and is not a data-based approach and does not assume that the available data covers all likely operating scenarios.

In another aspect, the present disclosure provides accurate and reliable design of Kalman filter (KF). In another aspect, the present disclosure considers the detection and isolation performance of the KF to depend crucially upon the accuracy and reliability of the KF model used. In one aspect, the present disclosure addresses this vital piece of information. In one aspect the present disclosure asserts that the KF must capture the dynamic and static behaviors of the system, not only at a given operating point but also over the entire operating regimes covering all variations in the system model, as exhibited by the variations in the subsystems whose faults the present disclosure isolates.

In another aspect, the present disclosure isolates multiple faults or simultaneous occurrence of faults in more than one subsystem.

In another aspect, the present disclosure estimates size of faults in addition to isolating a simple fault in a subsystem or multiple faults in subsystems In another aspect, the present disclosure ensures accuracy and optimality over wide operating regimes. The residual of the Kalman filter in the fault-free operating condition is ensured by adapting the Kalman gain so that the residual is a zero-mean white noise process. If the residual is 'large' then, according to a non-limiting embodiment of the present disclosure, the system is re-identified and the Kalman filter redesigned for the latest identified model.

In another aspect, the present disclosure uses provides diagnosis of incipient fault. According to a non-limiting embodiment of the present disclosure 'small' variations in the plant model are detected and isolated so that the faults can be accommodated in time before they grow large to cause performance degradation or in the extreme case a failure and a shutdown of the system.

In another aspect, in view of previously mentioned features, the present disclosure provides condition-based maintenance that is the provision of the estimated fault size by the scheme in the present disclosure, a condition-based maintenance program may be implemented effectively on the basis of the scheme in the present disclosure.

In another aspect, the present disclosure provides the Kalman filter-based soft-sensor. Soft sensors are invaluable in industrial applications in which hardware sensors are either too costly to maintain or to physically access. Software-based sensors act as the virtual eyes and ears of operators and engineers looking to draw conclusions from processes that are difficult—or impossible—to measure with a physical sensor. With no moving parts, the soft sensor offers a maintenance-free method for fault diagnosis and process control. They are ideal for use in aerospace, pharmaceutical, process control, mining, oil and gas, and healthcare industries. The soft sensor may be developed using the Kalman filter scheme proposed herein for fault diagnosis in view of its unique features of accuracy and reliability over wide operating regimes.

In another aspect the present disclosure provides condition-based maintenance.

In another aspect, the isolation scheme in the present disclosure is not based on a model-free technique, whose performance depends crucially upon the data being representative to cover all likely operating scenarios, but the isolation technique in the present disclosure uses a powerful model-based, KF-based scheme and hence inherits all the advantages of a KF.

In another aspect the distinguishing features of the present disclosure have been primarily motivated by addressing key issues in the KF-based detection and isolation scheme in the present disclosure. Such key motivating issues include the following: Although most successful fault diagnosis schemes use KF, their performances are intimately tied to how well the KF model has been designed, hence how accurate it is, and how reliable it is. Further, would the targeted scheme meet the important requirement of detecting small variations in the system's behavior, known as incipient faults, so that:

1. These variations are detected quickly and reliably before they are unknowingly allowed to cause performance degradations and possibly system failure and injury to the operating personnel. This addresses the important and difficult problem of detecting incipient faults, be they of a mechanical or electrical type or leak type 2. The quick and reliable detection of these small variations help develop condition monitoring and condition-based maintenance systems which are well endowed with the capability of detecting a range of faults, from incipient ones to large ones.

In meeting the above requirements, the present disclosure offers its unique distinguishing features as explained below:
a) Highly accurate detecting and isolation of faults, including incipient ones:

The present disclosure uses KF to detect and isolate 'small' variations in the system before these variations grow into a fault causing costly damage to the system and possible injury to the operating personnel. In order to meet this requirement, KF in the present disclosure is designed using a highly accurate and reliable identified model of the system. The identified model is obtained by performing a number of experiments on the system and using the unique use of the powerful concept of emulators to emulate likely operating scenarios including faults of different sizes, according to the present disclosure. The identified model thus obtained captures accurately the behavior of system over all relevant operating scenarios. Thus, according to one embodiment of the present disclosure any model mismatch resulting from the system drifting away from the normal operating point will be accurately diagnosed.

b) The fault isolation scheme in the present disclosure is efficient and has a low probability of false alarms and a high probability of correct decision similar to the detection performance. This feature is unique to the present disclosure as it stems from the unique use of the concept of emulators in the present disclosure, which involves the use of parameter-perturbed experiments that capture accurately the influence of the subsystem model parameters on the KF residual.

c) The scheme embedded in the present disclosure may be employed in the following practically motivated cases:
(i) When only a limited number of measured outputs are available, the powerful concept of the influence vector approach, a feature unique to the present disclosure, may then be used.
(ii) When outputs of all subsystems are available, the present disclosure's scheme can then be readily scaled up through the use of a bank of KFs.
(iii) In the intermediate case ranging between (i) and (ii), a combination of both the influence vector and bank of KF approaches may then be used d) The specific capability of accurately detecting small or incipient faults, as offered by the present disclosure, has a tremendously important application area in the detection of small leaks, specially of life-threatening material, such as poisonous gases, or small leaks of water that will, amongst other damages, either set off or worsen the corrosion process affecting the transport pipes.

In one aspect, the present disclosure is clearly distinguished by following salient features:

Feature 1: Kalman filter residual is used to detect and isolate multiplicative faults in simulated systems with low signal-to-noise ratio, and in physical systems as well.

Feature 2: The fault detection capability of the Kalman filter is extended to the important task of fault isolation Feature 3: Accurate and reliable identification: A nominal model and a map relating the Kalman filter residuals and the diagnostic parameters (parameters that characterize completely the behavior of the subsystems) are identified by performing a number of experiments to emulate likely operating regimes. The nominal model and the influence vectors (the map that relates the residuals and the diagnostic parameter variations) are accurate and reliable as they are identified from data covering wide operating regimes. The identified nominal model is embodied in the Kalman filter whereas the influence vectors are employed in the isolation of faults.

Feature 4: A linear regression model of the Kalman filtering residuals is proved to be a function of the variations in the diagnostic parameter, according to an embodiment of the present disclosure.

Feature 5 (Isolation of single faults): the present disclosure uses Composite Bayesian multiple hypothesis testing scheme to isolate simple fault, i.e., a single fault in one of the subsystems Feature 6 (Isolation of multiple faults): the present disclosure uses Composite Bayesian multiple hypothesis testing scheme to isolate simple fault, i.e., a fault in one of the subsystems as well as multiple faults, i.e., simultaneous faults in more than one subsystem Feature 7 (Estimation of fault size): Besides isolating a simple fault in a subsystem or multiple faults in different subsystems, the size of the fault is also estimated, according to one embodiment of the present disclosure.

Feature 8 (Ensuring accuracy and optimality): The residual of the Kalman filter in the fault-free operating condition is ensured by adapting the Kalman gain so that the residual is a zero-mean white noise process, according to one embodiment of the present disclosure. If the residual is 'large', then the system is re-identified and the Kalman filter is redesigned for the latest identified model, according to one aspect of the present disclosure.

Feature 9 (Diagnosis of incipient faults): In view of the above features 3 and 8, incipient faults ('small' variations in the plant model) are detected and isolated so that the faults can be accommodated in time before they grow large to cause performance degradation or, in the extreme case, a failure and a shutdown of the whole system.

Feature 10 (Condition-based maintenance): In view of the above feature 7, the estimation of the fault size may provide the basis for the development of an efficient and reliable condition-based maintenance program, capable of detecting the difficult-to-detect incipient faults.

Feature 11 (The Kalman filter-based soft-sensor): Soft sensors are invaluable in industrial applications in which hardware sensors are either too costly to maintain or to physically access. Software-based sensors act as the virtual eyes and ears of operators and engineers looking to draw conclusions from processes that are difficult—or impossible—to measure with a physical sensor. With no moving parts, the soft sensor offers a maintenance-free method for fault diagnosis and process control. They are ideal for use in aerospace, pharmaceutical, process control, mining, oil and gas, and healthcare industries. The soft sensor may be developed using the Kalman filter scheme proposed herein for fault diagnosis in view of its unique features especially Features 3 and 9 listed above Feature 12 (Theoretical justification): Thorough theoretical justification for fault diagnosis is provided in the present disclosure.

In another aspect the present disclosure provides unified detection and isolation of multiplicative faults in a simulated system with low signal to noise ratio or in physical systems.

In another aspect, the present disclosure uses the online adaptation of the Kalman gain as a key feature of the superior accuracy and incipient-fault detection capability of the present disclosure.

Figure 12:
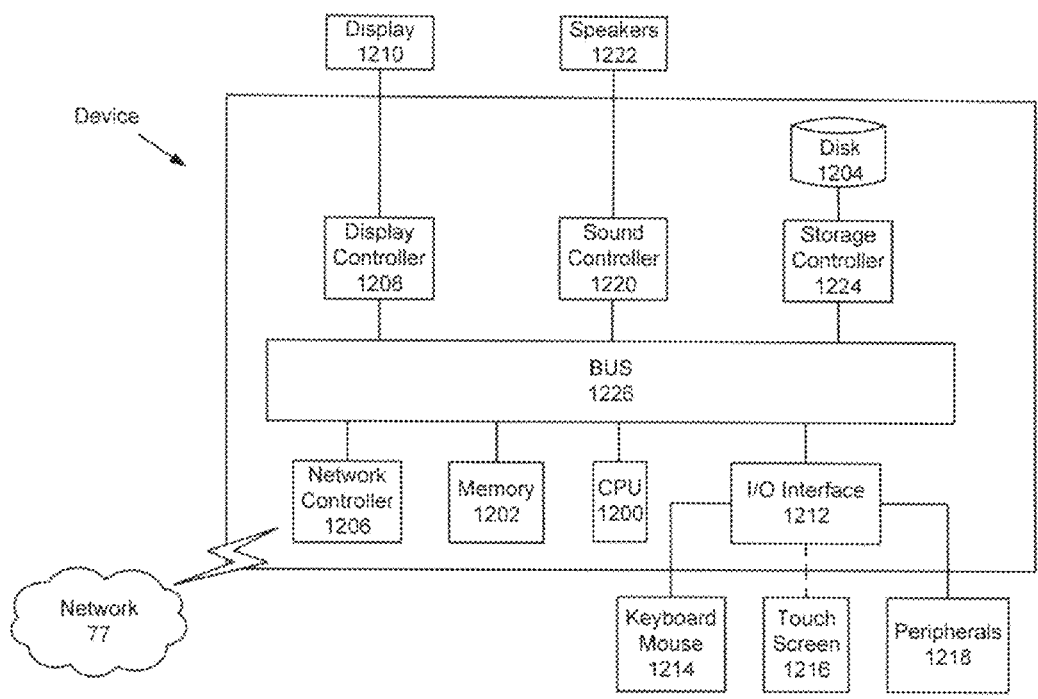
FIG. 12 shows a computer system upon which an embodiment of the present invention may be implemented.

Next, a hardware description of a device according to exemplary embodiments is described with reference to FIG. 12. In FIG. 12, the device includes a CPU 1200 which performs the processes described above. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 1200 and an operating system such as Microsoft Windows 7, UNIX, Solaris, LINUX, Apple MAC-OS and other systems known to those skilled in the art.

CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The device in FIG. 12 also includes a network controller 1206, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the device, such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

It must be noted that, as used in the specification and the appended claims, the singular forms "a," "an," and "the" include plural referents unless the context clearly dictates otherwise.

"A unified approach to detection and isolation of parametric faults using a Kalman filter residual-based approach," by Rajamani Doraiswami and Lahouari Cheded, in Journal of the Franklin Institute, 350(2013), pp. 938-965; and its Appendices are incorporated herein by reference in their entireties.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A computer-implemented method of fault isolation and detection in a physical fluid control system comprising a controller, a pump having a pump flow, a first tank having a leakage flow and a second tank having an output flow, wherein the controller is in operable connection with the pump and the pump is in fluid connection with the first tank by a first flow, and the first tank is in fluid connection with the second tank, comprising:
    carrying out unified detection and isolation of multiplicative faults of the fluid flows and control of the fluid control system with factors saved in a first memory of a computer and Kalman filtering residuals saved in a second memory of the computer;
    mapping the Kalman filter residuals with diagnostic parameters; and
    estimating, in the processor of the computer, influence vectors for the leakage flow, an actuator corresponding with the pump flow and sensor faults corresponding with the output flow by perturbing the diagnostic parameters one at a time during an off-line identification phase,
    isolating, in a processor of the computer, the multiplicative faults with composite Bayesian hypothesis testing taking into account statistics of noise and disturbances affecting the Kalman filter residuals based on the square of the cosine of angle between the residual of the diagnostic parameters and corresponding estimated influences.

2. The computer-implemented method of claim 1, wherein the unified detection and isolation of multiplicative faults is performed in a simulated system with various signal to noise ratios and a physical system.

3. The computer-implemented method of claim 1, further comprising:
    mapping the Kalman filter residuals and the diagnostic parameters to isolate a system fault.

4. The computer-implemented method of claim 1, wherein fault detection is carried out with a Kalman filter to isolate the multiplicative system faults.

5. The computer-implemented method of claim 1, further comprising applying a linear regression model of the Kalman filtering residuals to diagnostic parameter variations.

6. The computer-implemented method of claim 1, further comprising detecting the multiplicative system faults with the Kalman filter residuals as a multi-linear function of deviations in the diagnostic parameters.

7. The computer-implemented method of claim 1, wherein the Kalman filtering residuals are applied linearly separately in each of the diagnostic parameters.

8. The computer-implemented method of claim 1, wherein the mapping is carried out with a fault emulator.

9. The method of claim 1, wherein
    a Bayes decision strategy of $$l = \arg\left(\max_j \{\cos^2 \varphi_j(k)\}\right)$$

wherein
$\cos^2 \phi_j(k)$
is the cosine of the angle between the residual e(k) and its estimated influence
$\psi^T(k)\Omega_i$
given by $$\cos^2 \varphi_j(k) = \left[\frac{\langle e(k), \psi^T(k)\Omega_j\rangle}{\|e(k)\|\|\psi^T(k)\Omega_j\|}\right]^2.$$

10. The computer-implemented method of claim 1, further comprising providing an estimated fault size by a condition-based maintenance program operating on the computer.

11. A non-transitory computer readable medium having instructions stored therein that when executed by one or more processors cause the one or more processors to perform a method of unified detection and isolation of system faults in a physical fluid control system comprising a controller, a pump having a pump flow, a first tank having a leakage flow and a second tank having an output flow, wherein the controller is in operable connection with the pump and the pump is in fluid connection with the first tank by a first flow, and the first tank is in fluid connection with the second tank, the method comprising:
    carrying out unified detection and isolation of multiplicative faults of the fluid flows and control of the fluid control system with factors saved in a first memory of a computer and Kalman filtering residuals saved in a second memory of the computer;
    mapping the Kalman filter residuals with diagnostic parameters; and
    isolating, in a processor of the computer, system faults with composite Bayesian hypothesis testing taking into account statistics of noise and disturbances affecting the Kalman filter residuals,
    estimating, in the processor of the computer, influence vectors for the leakage flow, an actuator corresponding with the pump flow and sensor faults corresponding with the output flow by perturbing the diagnostic parameters one at a time during an off-line identification phase;
    isolating, in the processor of the computer, the multiplicative faults with composite Bayesian hypothesis testing taking into account statistics of noise and disturbances affecting the Kalman filter residuals based on the square of the cosine of angle between the residual of the diagnostic parameters and corresponding estimated influences.

12. The computer readable medium of claim 11, wherein the processors further perform the unified detection and isolation of multiplicative faults is performed in a simulated system with various signal to noise ratios and a physical system.

13. The computer readable medium of claim 11, wherein the processors map the Kalman filter residuals system faults and the diagnostic parameters to isolate a system fault.

14. The computer readable medium of claim 11, wherein the processors further perform fault detection with a Kalman filter to isolate the multiplicative system faults.

15. The computer readable medium of claim 11, wherein the processors further apply a linear regression model of the Kalman filtering residuals to diagnostic parameter variations.

16. The computer readable medium of claim 11, wherein the processors further perform detecting the multiplicative system faults with the Kalman filter residuals as a multi-linear function of deviations in the diagnostic parameters.

17. The computer readable medium of claim 11, wherein the processors further perform applying the Kalman filter residuals linearly and separately in each parameter.

18. The computer readable medium of claim 11, wherein the processors further perform the mapping with fault emulators.

19. The computer readable medium of claim 11, wherein the isolating is carried out with a Bayes decision strategy of $$l = \arg\left(\max_j \{\cos^2 \varphi_j(k)\}\right)$$

wherein
$\cos^2 \phi_i(k)$
is the cosine of the angle between the residual e (k) and its estimate
$\psi^T(k)\Omega_i$
given by $$\cos^2 \varphi_j(k) = \left[\frac{\langle e(k), \psi^T(k)\Omega_j \rangle}{\|e(k)\| \|\psi^T(k)\Omega_j\|}\right]^2.$$

20. The computer readable medium of claim 11, wherein the processors further provide an estimated fault size by a condition-based maintenance program.

* * * * *